(12) United States Patent
Mogill

(10) Patent No.: US 12,718,072 B1
(45) Date of Patent: Aug. 25, 2026

(54) APPARATUS AND METHODS FOR GENERATING A SEQUENCE OUTPUT

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/361,821

(22) Filed: Oct. 17, 2025

(51) Int. Cl.
*G06N 3/0475* (2023.01)
*G06N 3/042* (2023.01)
*G06N 3/092* (2023.01)

(52) U.S. Cl.
CPC .......... *G06N 3/0475* (2023.01); *G06N 3/042* (2023.01); *G06N 3/092* (2023.01)

(58) Field of Classification Search
None
See application file for complete search history.

(56) References Cited

U.S. PATENT DOCUMENTS 10,032,281 B1 * 7/2018 Ghesu .................... G06T 7/12
12,353,441 B1 * 7/2025 Zhao .................. G06F 18/2321
2021/0158146 A1 * 5/2021 Singh .................... G06N 20/20
2021/0256434 A1 8/2021 Dubey et al.
2022/0300487 A1 * 9/2022 Wright ................ G06Q 20/389
2024/0303544 A1 9/2024 Baranzini et al.

FOREIGN PATENT DOCUMENTS

IN 202521083408 A 10/2025

* cited by examiner

*Primary Examiner* — Eric Nilsson
(74) *Attorney, Agent, or Firm* — CALDWELL LLC

(57) ABSTRACT

An apparatus and method for generating a sequence output. The apparatus includes at least a processor and a memory communicatively connected to the at least a processor. The memory instructs the processor to receive one or more target datums of target data associated with an entity and a plurality of entity data, classify the plurality of entity data based on a category of data, weigh each classified datum by assigning a weight to classified data as a function of predicted return data and the target data, encode the weighted data of the plurality of entity data into a plurality of actions wherein each action corresponds to one or more target datums, and generate a sequence output as a function of a temporal datum of a plurality of temporal data associated with each of the one or more target datums of the target data and the plurality of actions.

20 Claims, 11 Drawing Sheets

Apparatus 100b
Temporal Data 148
Temporal Datum 146
Target Data 108
One or More Target Datums 106
Plurality of Entity Data 112
Entity 110
Entity Constraints 136
New Data 114
Memory 104
Modified Sequence Output 144
Sequence Ouput 116
Weighted Data 134
Plurality of Actions 132
Weight 122
Processor 102
Category of Data 118
Classified Datum 120
Predicted Return Data 124
Verification Protocol 140
Completion Datum 142

APPARATUS AND METHODS FOR GENERATING A SEQUENCE OUTPUT

FIELD OF THE INVENTION

The present invention generally relates to the field of artificial intelligence. In particular, the present invention is directed to an apparatus and a methods for generating a sequence output.

BACKGROUND

Modern computing systems often struggle to manage large sets of heterogeneous data that must be organized into ordered sequences of actions. Existing architectures typically rely on static scheduling or rigid dependency models, which are difficult to update when new data becomes available. As a result, changes to prerequisites, timing, or interdependencies can create inconsistencies, inefficiencies, or failures in executing complex processes.

SUMMARY OF THE DISCLOSURE

In an aspect, an apparatus for generating a sequence output includes at least a processor and a memory communicatively connected to the at least a processor. The memory contains instructions configuring the processor to receive, using the at least a processor, one or more target datums of target data associated with an entity and a plurality of entity data, classify the plurality of entity data based on a category of data, weigh each classified datum by assigning a weight to classified data as a function of predicted return data and the target data, encode the weighted data of the plurality of entity data into a plurality of actions wherein each action of the plurality of actions corresponds to one or more target datums of the target data, and generate a sequence output as a function of a temporal datum of a plurality of temporal data associated with each of the one or more target datums of the target data and the plurality of actions.

In another aspect, a method for generating a sequence output includes receiving, using at least a processor, one or more target datums of target data associated with an entity and a plurality of entity data, classifying, using the at least a processor, the plurality of entity data based on a category of data, weighing, using the at least a processor, each classified datum by assigning a weight to classified data as a function of predicted return data and the target data, encoding, using the at least a processor, the weighted data of the plurality of entity data into a plurality of actions wherein each action of the plurality of actions corresponds to one or more target datums of the target data, and generating, using the at least a processor, a sequence output as a function of a temporal datum of a plurality of temporal data associated with each of the one or more target datums of the target data and the plurality of actions.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating a sequence output. The apparatus includes at least a computing device comprised of a processor and a memory communicatively connected to the processor. The memory instructs the processor to receive one or more target datums of target data associated with an entity and a plurality of entity data. The processor classifies the plurality of entity data based on a category of data. The processor weighs each classified datum by assigning a weight to classified data as a function of predicted return data and the target data. Additionally, the processor encodes the weighted data of the plurality of entity data into a plurality of actions wherein each action of the plurality of actions corresponds to one or more target datums of the target data. The processor generates a sequence output as a function of a temporal datum of a plurality of temporal data associated with each of the one or more target datums of the target data and the plurality of actions.

Figure 1A:
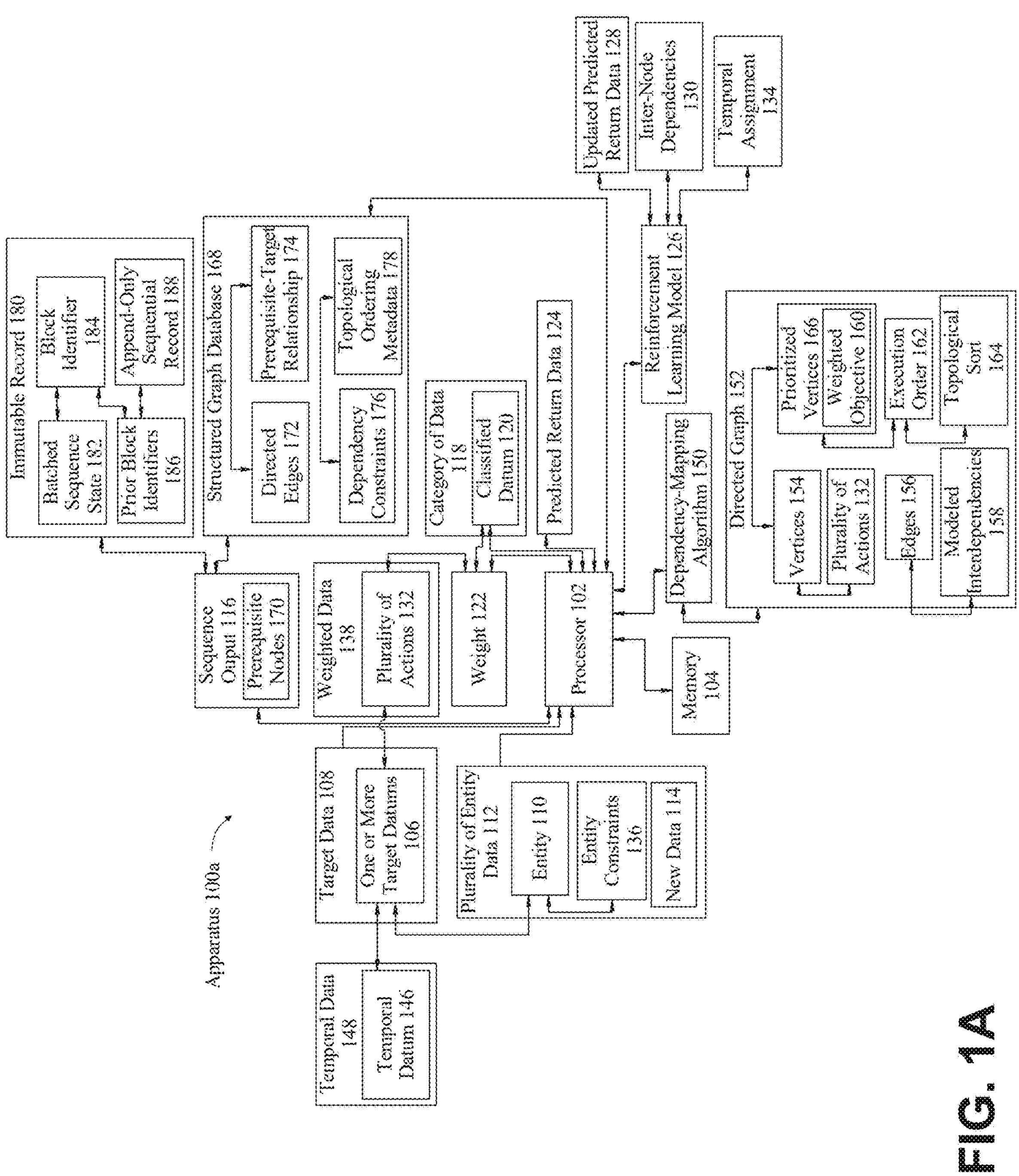
FIG. 1A-C are block diagrams of an apparatus for generating a sequence output.
Figure 1B:
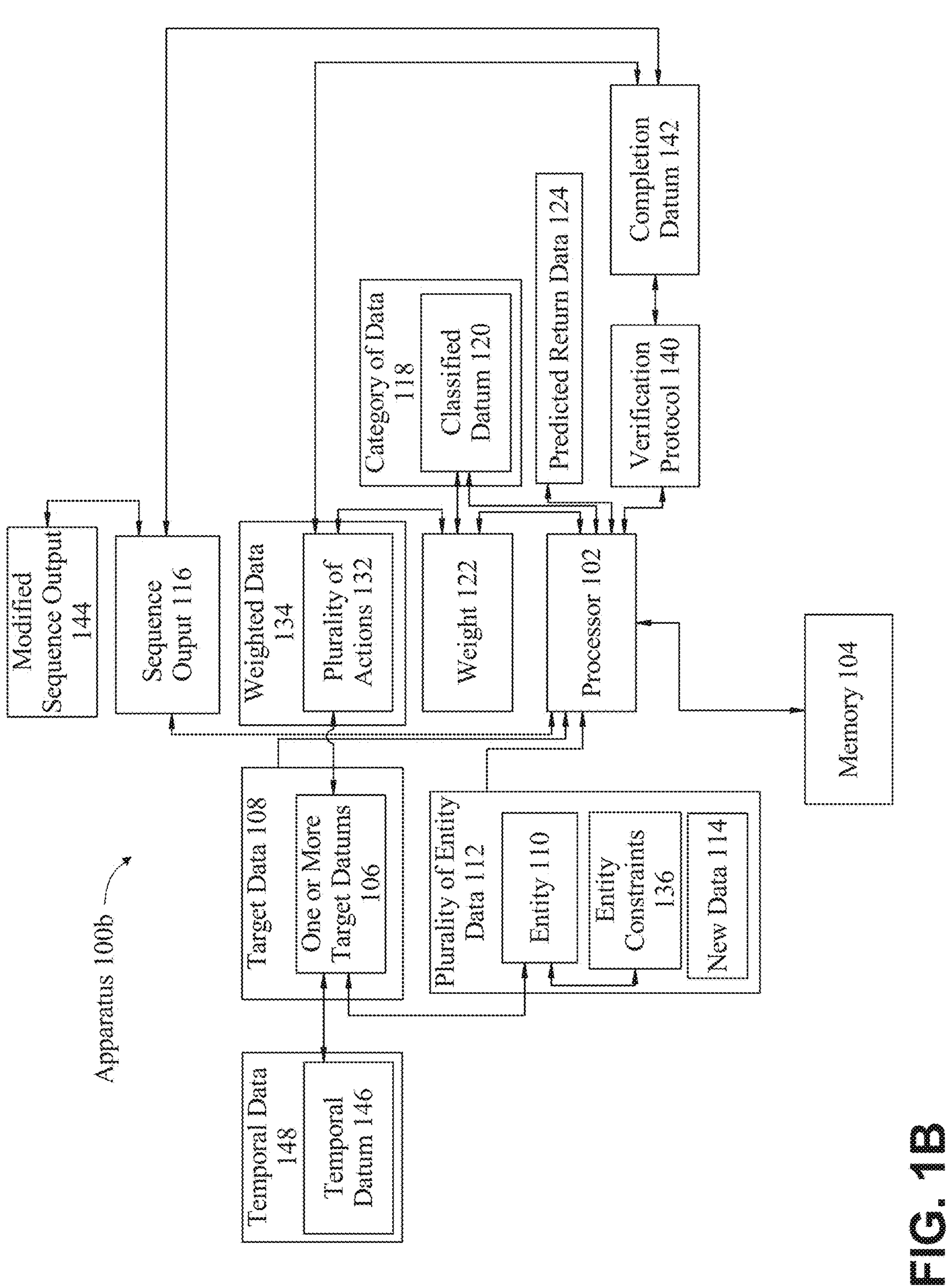
Figure 1C:
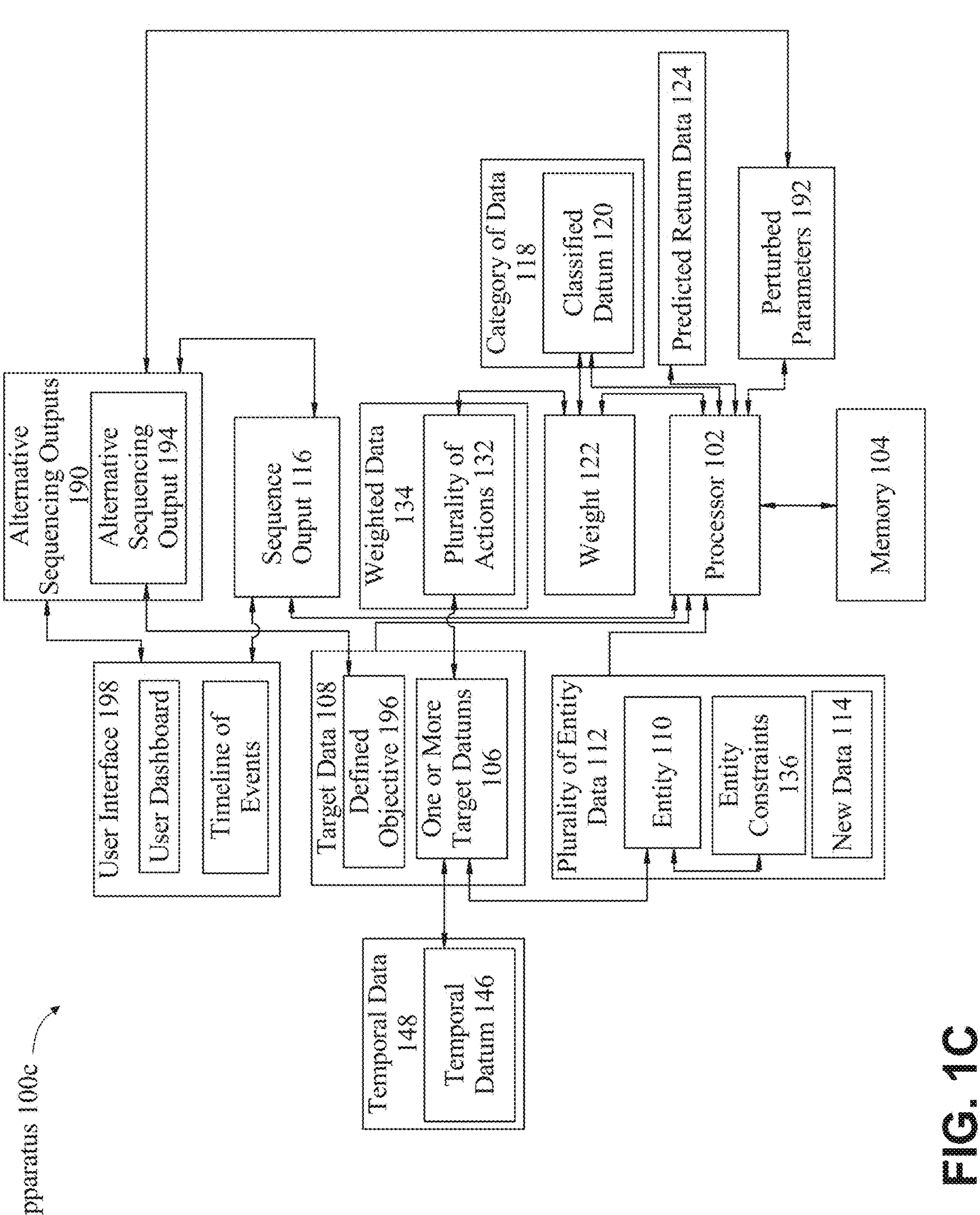

Referring now to FIG. 1A-C, an exemplary embodiment of apparatus 100*a-c* for generating a sequence output is illustrated. Apparatus 100*a-c* may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1A-C, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1A-C, apparatus 100*a-c* may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1A-C, apparatus 100*a-c* may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1A-C, apparatus 100*a-c* may include any "computing device" as described in this disclosure, including without limitation a microcontroller, microprocessor, digital signal processor (DSP) and/or system on a chip (SoC) as described in this disclosure. Apparatus 100*a-c* may include, be included in, and/or communicate with a mobile device such as a mobile telephone or smartphone. Apparatus 100*a-c* may include a single computing device operating independently, or may include two or more computing devices operating in concert, in parallel, sequentially or the like; two or more computing devices may be included together in a single computing device or in two or more computing devices. Apparatus 100*a-c* may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100*a-c* may include one or more computing devices dedicated to data storage, security, distribution of traffic for load balancing, and the like. Apparatus 100*a-c* may distribute one or more computing tasks as described below across a plurality of computing devices of computing device, which may operate in parallel, in series, redundantly, or in any other manner used for distribution of tasks or memory between computing devices. Apparatus 100*a-c* may be implemented, as a non-limiting example, using a "shared nothing" architecture.

With continued reference to FIG. 1A-C, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1A-C, processor 102 is configured to receive one or more target datums 106 of target data 108 associated with an entity 110 and a plurality of entity data 112. As used in this disclosure, "target data" is information associated with one or more objectives, milestones, or deliverables that an entity 110 seeks to achieve, wherein the target data 108 provides a reference point for generating a sequence output 116. As used in this disclosure, an "entity" is an organization, individual, or other definable body. Without limitation, the entity 110 may include a law firm, that is associated with the target data 108 and the entity data 112. As used in this disclosure, "entity data" is information associated with an entity 110. Without limitation, the entity data 112 may include law firm data, that provides contextual, operational, or informational inputs used in relation to the target data 108 for generating a sequence output 116. In a non-limiting example, the processor 102 may be configured to receive target data 108 and entity data 112 through a variety of input channels, such as APIs that communicate with third-party platforms like case management or project tracking systems, GUIs that permit human users to enter or update milestones and deliverables, or web crawlers that gather supplemental information from public or private online sources. In a non-limiting example, the system may also be configured to receive data from cloud-based storage, structured databases, or uploaded documents, thereby accommodating both structured and unstructured forms of information. In a non-limiting example, once the data is received, the system may organize it into entity profiles that serve as structured repositories associated with each entity 110. As used in this disclosure, an "entity profile" is a structured data construct associated with an entity 110 that organizes, stores, and maintains a plurality of entity data 112 in relation to target data 108. Without limitation, the entity profile may include operational records, historical outcomes, and metadata that collectively represent the state, attributes, and objectives of the entity 110. These profiles may capture current operational data, historical records, and metadata such as deadlines, jurisdictional requirements, client identifiers, and the like. In a non-limiting example, the profiles may be continuously updated when new data 114 becomes available, ensuring that they remain current while also preserving previous versions for historical tracking. In a non-limiting example, the system may classify the data within each profile according to categories such as legal, financial, operational, and the like, and then associate each classified datum 120 with related target data 108, such as downstream deliverables or firm milestones. The profiles may also establish semantic relationships among interdependent data points, allowing the processor 102 to recognize prerequisites, constraints, and dependencies across actions 132. In a non-limiting example, the creation and maintenance of these profiles may enable the processor 102 to streamline analysis and sequencing by keeping all relevant data for an entity 110 logically organized and directly aligned with the defined objectives 196 of the target data 108.

With continued reference to FIG. 1A-C, the at least a processor 102 may be further configured to receive new data 114 of the plurality of entity data 112 and target data 108 and continuously update the sequence output 116 as a function of the new data 114 of the plurality of entity data 112 and target data 108. As used in this disclosure, "new data" is information that was not previously available within the entity data 112 and that becomes available after an earlier state of processing. Without limitation, the new data 114 may include updates, corrections, additions, external context, and the like, related to the plurality of entity data 112 and the target data 108. As used in this disclosure, a "sequence output" is an ordered arrangement of actions 132 derived from classified and weighted data 138 that specifies a time-aware execution order 162 aligned with target data 108. Without limitation, the sequence output 116 may include converting diagnostic outputs into a sequenced execution plan that integrates operational, marketing, leadership milestones, and the like. In a non-limiting example, the at least a processor 102 may receive new data 114 through APIs connected to enterprise systems, graphical user interfaces (GUIs) that allow controlled user entry or correction of values, web crawlers that collect publicly available updates, and the like. Without limitation, the processor 102 may normalize formats, perform schema mapping, and attach provenance metadata before updating the corresponding entity profile. In a non-limiting example, the processor 102 may normalize formats when receiving date-related information in different structures, such as "Jan. 12, 2025," "Jan. 12, 2025," or "2025 Jan. 12," by converting all entries into a standardized ISO format before updating the entity profile. In a non-limiting example, the processor 102 may perform schema mapping where financial data arriving from one system under the label "Revenue" and from another system as "Sales" is automatically aligned to a common schema attribute, ensuring consistent interpretation across the entity profile. In a non-limiting example, the processor 102 may attach provenance metadata by recording that a deadline came from a user input through a GUI at a specific timestamp, while another datum originated from an API pull from a docketing system, thereby enabling traceability, auditability, and contextual trustworthiness of each piece of data stored in the entity profile. As used in this disclosure, "provenance metadata" is contextual information associated with a datum that records the origin, source, and characteristics of the datum. The provenance metadata may include attributes such as the method of collection, the time of receipt, the originating system or user, and any transformations applied. For example, provenance metadata may indicate that a filing deadline was received through a GUI input by an administrator on a certain date and time. For example, provenance metadata may record that a financial value was retrieved through an API from an accounting system and automatically converted from U.S. dollars to euros. For example, provenance metadata may capture that a client identifier was extracted from a PDF document using natural language processing and tagged with confidence scores reflecting the extraction accuracy. Without limitation, provenance metadata may enable traceability, auditability, and validation of the datum within an entity profile. In a non-limiting example, the processor 102 may apply natural language processing to unstructured documents, feature extraction to structured records, and entity-resolution techniques to align the new data 114 with existing identifiers, after which it may write the results to a structured graph database 168 that models actions 132 as vertices 154 and dependencies as edges 156. In a non-limiting example, the processor 102 may compute or recompute weights using predictive models, such as gradient-boosted trees or neural networks trained on historical return data, store features in a feature store, embed text with vector encoders for similarity lookups, and then pass the weighted graph to a dependency-mapping and constraint-satisfaction layer that may use topological sorting conditioned on priorities, critical-path analysis, and mixed-integer or CP-SAT solvers to respect resource, temporal, and prerequisite constraints. In a non-limiting example, the processor 102 may convert diagnostic outputs into the sequence output 116 by translating detected gaps or risks into parameterized actions 132 with temporal assignments 134, allocating them across operational, marketing, and leadership workstreams, and scheduling them on a calendar timeline while attaching verification protocols and completion data hooks. In a non-limiting example, the processor 102 may employ an event-driven architecture with message queues for change notifications, a streaming framework for near-real-time updates, and a reinforcement learning policy to recalibrate action weights and inter-node priorities based on observed outcomes. Without limitation, the processor 102 may persist sequence snapshots to an immutable append-only record using hashed blocks, update dashboard views through a UI service that highlights the first action by earliest temporal datum 146, and notify downstream devices of critical-path changes so that the sequence output 116 continuously reflects the new data 114 associated with the plurality of entity data 112 and the target data 108.

Still referring to FIG. 1A-C, processor 102 is configured to classify the plurality of entity data 112 based on a category of data 118. As used in this disclosure, a “category of data” is a classification label assigned to a datum of entity data 112 that groups the datum according to a thematic, functional, or contextual domain relevant to the entity 110 and its operations. The category of data 118 may provide organizational structure that allows the processor 102 to analyze, weigh, and sequence related information in alignment with target data 108. In a non-limiting example, the category of data 118 may include Employees, where the processor 102 classifies information such as staffing levels, skill sets, availability, or performance records. In a non-limiting example, the category of data 118 may include Culture, where the processor 102 classifies information such as organizational values, employee engagement survey results, or leadership communication practices. In a non-limiting example, the category of data 118 may include Revenue, where the processor 102 classifies financial information such as gross income, billable hours, accounts receivable, or profitability measures. In a non-limiting example, the category of data 118 may include Clients, where the processor 102 classifies information such as client identities, engagement history, case outcomes, or satisfaction metrics. In a non-limiting example, the processor 102 may be configured to extend the category of data 118 to additional domains, such as Operations, Technology, Compliance, or Market Conditions, depending on the industry and the scope of the entity profile. In a non-limiting example, the classification process may employ natural language processing to extract key attributes from unstructured documents, relational mapping to align fields from structured records to categories, and machine learning classifiers to automatically assign new incoming data to the most relevant category of data 118. Without limitation, the categorization of data ensures that diverse entity data 112 is logically organized, consistently interpretable, and suitable for downstream processing into a sequence output 116.

Still referring to FIG. 1A-C, processor 102 is configured to weigh each classified datum 120 by assigning a weight 122 to classified data as a function of predicted return data 124 and the target data 108. As used in this disclosure, a “classified datum” is a unit of entity data 112 that has been assigned to a category of data 118, wherein the classification provides contextual meaning that allows the processor 102 to analyze the datum in relation to other data and the target data 108. As used in this disclosure, a “weight” is a numerical value assigned to a classified datum 120 that represents the relative importance, priority, or influence of the classified datum 120 when generating a sequence output 116. As used in this disclosure, “predicted return data” is evaluative information that estimates the potential outcome, benefit, or impact of considering a particular classified datum 120 in relation to the target data 108. In a non-limiting example, the processor 102 may weigh each classified datum 120 by evaluating the predicted return data 124 against the defined target data 108, and then assigning a value that reflects how strongly the datum contributes toward achieving the target. In a non-limiting example, if the target data 108 includes reducing operational costs, a classified datum 120 related to infrastructure utilization may be assigned a higher weight 122 if the predicted return data 124 shows significant cost savings per transaction. In a non-limiting example, if the target data 108 is tied to increasing client satisfaction, a classified datum 120 associated with client engagement duration may be weighted more heavily when predicted return data 124 suggests strong correlation with improved outcomes. In a non-limiting example, predicted return data 124 may include performance improvement metrics such as latency reduction or throughput gain, which are used to estimate how a datum improves system responsiveness. In a non-limiting example, predicted return data 124 may include adoption signals such as active user counts or utilization percentages, which forecast how widely a new process or output may be accepted. In a non-limiting example, predicted return data 124 may include cost efficiency metrics such as reductions in compute requirements, which quantify financial or resource savings. In a non-limiting example, predicted return data 124 may include revenue contribution estimates, such as projected increases in client acquisition, which tie the datum directly to growth outcomes. In a non-limiting example, predicted return data 124 may include scalability gains, such as the maximum supported workload, which indicate future capacity improvements. In a non-limiting example, predicted return data 124 may include risk reduction indices, such as closure rates of security vulnerabilities, which measure the impact of the datum on system resilience. In a non-limiting example, predicted return data 124 may include time-to-impact metrics, such as how quickly improvements will manifest, thereby affecting prioritization. In a non-limiting example, predicted return data 124 may include sustainability indicators, such as reduced carbon impact, which address environmental objectives. In a non-limiting example, predicted return data 124 may include reliability outcomes, such as improved uptime or mean-time-between-failures, which emphasize stability.

With continued reference to FIG. 1A-C, the at least a processor 102 may be further configured to recalibrate, using a reinforcement learning model 126, the sequence output 116 by recomputing the weight 122 assigned to the categorized data as a function of updated predicted return data 128, updating inter-node dependencies 130 based on new entity data, and modifying a temporal assignment 134 of the plurality of actions 132 based on entity constraints 136. As used in this disclosure, a "reinforcement learning model" is a machine learning framework configured to optimize decision-making by receiving feedback signals from prior actions 132, wherein the model adjusts policies for weighting, sequencing, or ordering data to improve outcomes over time based on reward functions tied to target data 108. As used in this disclosure, "updated predicted return data" is revised evaluative information recalculated after the availability of new information, actualized performance outcomes, or environmental changes, wherein the updated predicted return data 128 reflects more accurate estimates of the potential outcome, benefit, or impact of considering a particular classified datum in relation to the target data 108. As used in this disclosure, "inter-node dependencies" are relationships between nodes of a sequence output 116 that define prerequisite or conditional linkages, wherein changes to one node may affect the timing, execution, or prioritization of related nodes. As used in this disclosure, "new entity data" is additional or modified information associated with an entity 110 that becomes available after the creation of an earlier state of the entity profile. Without limitation, the new entity data may alter classification, weighting, or sequencing of actions 132 relative to the target data 108. As used in this disclosure, a "temporal assignment" is the allocation of a specific time, order, or duration to an action within the sequence output 116. In an embodiment, the temporal assignment 134 may determine when an action is scheduled or executed in relation to other actions 132. As used in this disclosure, "entity constraints" are operational, structural, or contextual limitations associated with an entity 110 that restrict or condition the ordering, timing, or feasibility of actions 132 within the sequence output 116. Without limitation, the entity constraints 136 may include factors such as resource availability, compliance requirements, jurisdictional deadlines, workforce capacity, and the like. In a non-limiting example, the reinforcement learning model 126 may use client performance data as feedback to update milestone pacing, recompute weights with updated predicted return data 128, adjust inter-node dependencies 130 when new entity data reveals shifted prerequisites, and modify temporal assignments 134 to account for entity constraints 136 such as staffing availability or regulatory deadlines. This adaptive recalibration may enable the sequence output 116 to remain aligned with real-world conditions while progressively improving its efficiency and effectiveness.

Still referring to FIG. 1A-C, processor 102 is configured to encode the weighted data 138 of the plurality of entity data 112 into a plurality of actions 132 wherein each action of the plurality of actions 132 corresponds to one or more target datums 106 of the target data 108. As used in this disclosure, an "action" is a discrete, processor-encoded operation, task, or milestone derived from weighted entity data 112 that corresponds to target data 108, wherein the action represents an executable unit within the sequence output 116. In a non-limiting example, the processor 102 may encode weighted data 138 into a plurality of actions 132 such that each action is aligned with specific downstream deliverables or milestones. In a non-limiting example, if the target data includes reaching a revenue milestone, the processor 102 may encode weighted financial data into an action requiring the launch of a new client service. In a non-limiting example, if the target data relates to operational efficiency, the processor 102 may encode staffing and workflow data into an action requiring reallocation of employees or adoption of a new tool. In a non-limiting example, if the target data includes expanding client engagement, the processor 102 may encode marketing-related data into an action requiring the initiation of a campaign or client outreach event. In a non-limiting example, the actions 132 may be represented in a graph-based roadmap, where each action is modeled as a node linked to dependencies, priorities, temporal assignments 134, and the like. The graph-based structure may be dynamic, enabling recalibration as new data 114 becomes available, reinforcement learning models 126 adjust weight 122 assignments, or entity constraints 136 evolve. Without limitation, actions 132 may form an adaptive planning infrastructure that integrates operational, marketing, and leadership milestones into a unified, dynamically updating roadmap that provides strategic growth and execution value to the entity 110.

With continued reference to FIG. 1A-C, the weighted data 138 may first be preprocessed and normalized to ensure consistency, which may include scaling values into a uniform range, filtering out noise, or applying dimensionality reduction so that the most relevant parameters are emphasized. From this normalized data, the processor 102 may then extract features that correspond to actionable parameters, which may be achieved through vector embeddings, categorical encoding, or temporal encoding depending on the nature of the data. Once features are extracted, the processor 102 may implement an encoding mechanism that could be rule-based, model-driven, or neural-network-based, where rules, machine learning models, or neural architectures transform the weighted data into action representations. As used in this disclosure, an "encoding mechanism" is a computational framework or method by which weighted data 138 is transformed into a structured plurality of actions 132 that are aligned with downstream deliverables or milestones. The encoding mechanism may be implemented in different forms, such as rule-based, model-driven, or neural-network-based, each providing varying levels of determinism, adaptability, and complexity in mapping data to actions. In a non-limiting example, a rule-based encoding mechanism may operate through predefined logic or conditional mappings, where specific thresholds or conditions in the weighted data trigger corresponding actions. For instance, if a weight associated with staffing utilization falls below a threshold, a rule may encode that into an action requiring the reallocation of employees. Such mechanisms are deterministic, transparent, and well-suited to scenarios with clearly defined parameters and low variability. In a non-limiting example, a model-driven encoding mechanism may employ statistical or algorithmic models, such as decision trees, regression analysis, or optimization algorithms, to interpret weighted data and map it to actions. For example, a linear programming model may evaluate financial and operational weights simultaneously to generate an optimal set of actions that maximize efficiency while ensuring milestone alignment. This approach allows more flexibility than rule-based encoding by incorporating multiple variables and balancing trade-offs. In a non-limiting example, a neural-network-based encoding mechanism may leverage deep learning architectures, such as feed-forward neural networks, recurrent neural networks (RNNs), or transformers, to encode weighted data into action vectors. In this case, the neural architecture may be trained on historical data, allowing it to infer complex, nonlinear relationships between input weights and the most effective downstream actions. For example, given financial, marketing, and operational data, a neural network may encode them into coordinated actions such as launching a client service, reallocating staff, and initiating a marketing campaign in a sequence optimized for milestone achievement. Neural-based encoding may also adapt dynamically as new data 114 becomes available, enabling reinforcement learning models 126 to continuously adjust the mapping of weights 122 to actions 132. Without limitation, these encoding mechanisms may operate independently or in hybrid fashion, where a rule-based framework governs baseline decisions, a model-driven framework optimizes resource allocations, and a neural-network-based framework adapts actions dynamically to evolving data inputs. This layered approach may provide a robust and adaptive infrastructure for translating weighted data into actionable, milestone-oriented outputs. These encoded actions may then be aligned with downstream deliverables or milestones through optimization or constraint satisfaction techniques, ensuring that the collection of actions supports project goals. The processor 102 may further serialize the encoded actions into formats such as workflow tokens, structured data representations like JSON or protocol buffers, or temporal encodings with timestamps and triggers, thereby making them executable by downstream systems. Finally, the processor 102 may validate the encoded actions against expected deliverables through simulation or testing, with feedback used to adjust weight distributions and refine subsequent action encoding. Technologies that may be employed in this process can include preprocessing frameworks such as NumPy or TensorFlow, machine learning libraries such as PyTorch or Scikit-learn, optimization tools such as OR-Tools or Gurobi, serialization formats such as JSON, XML, or Protocol Buffers, and workflow orchestration systems such as Apache Airflow or Camunda, with implementations optionally extending to hardware-based encoders for real-time processing. In a non-limiting example, an encoder may be implemented in different forms depending on the nature of the weighted data 138 and the desired alignment with downstream deliverables or milestones. A rule-based encoder may operate through deterministic logic, where predefined thresholds or conditions in the weighted data are mapped to corresponding actions. For instance, if revenue performance falls below a defined threshold, the encoder may output an action requiring the launch of a new service, or if staffing utilization dips below an efficiency target, the encoder may output an action requiring reallocation of employees. A model-driven encoder may instead rely on statistical or optimization methods, such as regression models or linear programming, to transform weighted data into actions by balancing multiple variables. For example, an optimization-based encoder may evaluate financial, staffing, and operational weights simultaneously to generate a set of actions that maximize milestone achievement while minimizing cost. A machine learning encoder may be trained on historical data to identify patterns between weighted inputs and successful outcomes, enabling it to output actions such as initiating a marketing campaign when engagement weights fall below a certain level. In another non-limiting example, a neural network encoder may apply deep learning architectures, such as feed-forward or recurrent neural networks, to capture nonlinear relationships across financial, operational, and marketing data and encode them into coordinated multi-step actions like launching a new client service, reallocating staff, and initiating a campaign in sequence. A graph-based encoder may represent actions as nodes within a dynamic graph structure, where dependencies, priorities, and temporal assignments are updated as new data 114 becomes available, reinforcement learning models 126 adjust weights 122, or constraints 136 evolve. Without limitation, a hybrid encoder may combine two or more of these approaches, such as using rules for compliance-driven decisions, models for resource balancing, and neural networks for adaptive learning, thereby creating a robust and flexible mechanism for transforming weighted data into actions that support strategic growth and execution.

With continued reference to FIG. 1A-C, the at least a processor 102 may be further configured to verify, using a verification protocol 140, a completion datum 142 associated with each action of the plurality of actions 132 and generate a modified sequence output 144 based on the completion datum 142. As used in this disclosure, a "verification protocol" is a set of procedures, rules, or computational checks employed by the processor 102 to confirm whether an action of the sequence output 116 has been successfully executed in accordance with its defined parameters, wherein the verification protocol 140 may utilize system logs, external confirmations, sensor data, or user attestations. As used in this disclosure, a "completion datum" is information generated or recorded to indicate that an action has reached a defined endpoint or state of fulfillment, wherein the completion datum 142 may include timestamps, status flags, transaction identifiers, or external confirmations evidencing that the action was carried out. As used in this disclosure, a "modified sequence output" is an updated version of the sequence output 116 recalculated by the processor 102 after incorporating one or more completion data. In an embodiment, the modified sequence output 144 may account for completed actions 132, adjusted dependencies, rescheduled remaining actions 132, and the like, to align with the evolving state of the entity 110 and entity constraints 136. In a non-limiting example, the verification protocol 140 may operate by cross-referencing a system-generated log to confirm that a software deployment action was executed successfully, comparing hash values of output files to confirm integrity, receiving an API callback from a downstream platform to verify that a client deliverable was sent, and the like. In a non-limiting example, the completion datum 142 may include a digital signature from a project manager confirming milestone approval, a blockchain-based hash that secures evidence of action completion, a time-stamped entry generated by an automated workflow tool, and the like. In a non-limiting example, once a completion datum 142 is verified, the processor 102 may generate a modified sequence output 144 by removing the completed action from pending tasks, recalibrating weights of remaining classified data, and adjusting inter-node dependencies 130 to reflect the new state of progress. In a non-limiting example, the apparatus 100_a-c_ may use blockchain or distributed ledger frameworks for immutable recording of completion data, workflow automation platforms (e.g., BPM engines) for detecting task status changes, smart contracts for auto-verifying action completion based on predefined conditions, API integrations with third-party tools to collect completion confirmations, and machine learning anomaly detection models to identify false or incomplete completions. In a non-limiting example, the modified sequence output 144 may then be visualized on a dynamic dashboard, where completed actions 132 are marked as verified, pending actions 132 are recalculated into a new order, and impacted dependencies are highlighted to downstream users.

Still referring to FIG. 1A-C, processor 102 is configured to generate a sequence output 116 as a function of a temporal datum 146 of a plurality of temporal data 148 associated with each of the one or more target datums 106 of the target data and the plurality of actions 132. As used in this disclosure, a "temporal data" is information that defines or describes timing characteristics. Without limitation, the temporal data 148 may describe the timing characteristics of an action within a sequence output 116. In an embodiment, the temporal data 148 may include attributes such as start time, end time, deadlines, durations, intervals relative to other actions 132, and the like. In a non-limiting example, temporal data 148 may include a specific deadline by which a legal filing must be submitted, a scheduled start time for a marketing campaign, the estimated duration required to complete a leadership review task, and the like. In a non-limiting example, temporal data 148 may capture dependencies across actions 132, such as requiring one action to begin only after the completion of another, or adjusting timelines dynamically when new entity data alters prerequisites. In a non-limiting example, the processor 102 may incorporate temporal data 148 into the sequence output 116 by aligning actions 132 with calendars, project timelines, or workflow schedules, thereby ensuring that execution order 162 is not only logically correct but also temporally feasible. In a non-limiting example, technologies that may support temporal data 148 management include scheduling engines, critical path analysis algorithms, calendar APIs, and time-series databases that record historical and projected temporal attributes of actions 132. This may ensure that each action in the modified sequence output 144 is executed at the appropriate point in time, accounting for both dependencies and real-world constraints. As used in this disclosure, a "scheduling engine" is a computational system configured to allocate resources and assign start and end times to actions 132 within a sequence output 116. Without limitation, the scheduling engine may automatically optimize execution order 162 subject to temporal data 148, inter-node dependencies 130, and entity constraints 136. In a non-limiting example, a scheduling engine may assign staff availability to project tasks, ensure deadlines are met by automatically rescheduling lower-priority actions 132, or optimize workloads across multiple teams using constraint-satisfaction algorithms. As used in this disclosure, a "critical path analysis algorithm" is a computational procedure that identifies the sequence of dependent actions 132 that determines the minimum time required to complete a sequence output 116. Without limitation, delays to any critical path action may directly extend the overall timeline. In a non-limiting example, a critical path analysis algorithm may evaluate the dependencies between legal filing preparation, client review, court submission deadlines, and the like, to highlight the precise sequence of tasks that cannot be delayed without risking missed filings. As used in this disclosure, a "calendar API" is an application programming interface that provides programmatic access to scheduling data stored in a digital calendar system. In an embodiment, the calendar API may allow the processor 102 to insert, update, or retrieve temporal data 148 associated with sequenced actions 132. In a non-limiting example, a calendar API may be used to automatically schedule a client presentation into an attorney's calendar once the preceding research and drafting actions 132 are verified as completed. As used in this disclosure, a "time-series database" is a specialized data storage system optimized for handling data points indexed by time. In an embodiment, the time-series database may store both historical temporal data 148 and projections of future scheduling attributes for sequenced actions 132. In a non-limiting example, a time-series database may record the historical durations of prior patent application drafting tasks, project the expected time to complete a current drafting action, and enable the processor 102 to update predictions dynamically as new data 114 about progress becomes available.

With continued reference to FIG. 1A-C, the at least a processor 102 may be further configured to generate, using a dependency-mapping algorithm 150, the sequence output 116 by generating a directed graph 152 comprising vertices 154 and edges 156, wherein the vertices 154 represent actions 132 and the edges 156 represent modeled interdependencies 158, prioritizing the vertices 154 using a weighted objective 160, and producing an execution order 162 by performing a topological sort 164 conditioned on prioritized vertices 166. As used in this disclosure, a "dependency-mapping algorithm" is a computational procedure configured to identify, represent, and organize relationships among a plurality of actions 132. Without limitation, the dependency-mapping algorithm 150 may determine how the completion or initiation of one action constrains or enables another action within a sequence output 116. As used in this disclosure, a "directed graph" is a data structure comprising a set of vertices 154 connected by edges 156. Without limitation, each edge may include a defined direction that indicates dependency or flow between two vertices 154. As used in this disclosure, a "vertex" is a node within a directed graph 152. Without limitation each vertex may represent an action of the sequence output 116. As used in this disclosure, an "edge" is a directional link between two vertices 154 in a directed graph 152. Without limitation, the edge may represent a modeled interdependency between the actions 132 represented by the connected vertices 154. As used in this disclosure, a "modeled interdependency" is a computationally defined relationship between two or more actions 132. In an embodiment, the modeled interdependency may include a relationship that specifies constraints such as prerequisites, conditional triggers, or resource-sharing requirements that govern execution. As used in this disclosure, a "weighted objective" is a computational prioritization metric assigned to vertices 154. Without limitation, the weighted objective 160 may reflect the relative importance, urgency, or predicted return value of an action with respect to target data. As used in this disclosure, an "execution order" is the sequence in which actions 132 are arranged and scheduled for performance. In an embodiment, the execution order 162 may account for modeled interdependencies 158, temporal data 148, and weighted objectives 160. As used in this disclosure, a "topological sort" is a graph-based algorithm that orders the vertices 154 of a directed graph 152. In an embodiment, the topological sort 164 may include that for every directed edge from vertex A to vertex B, vertex A appears before vertex B in the ordering. As used in this disclosure, a "prioritized vertex" is a vertex that has been ranked or ordered relative to other vertices 154 based on a weighted objective 160, wherein the prioritization influences its placement in the topological sort 164 and thus the resulting execution order 162. In a non-limiting example, the processor 102 may be configured to implement a dependency-mapping algorithm 150 to organize a firm's roadmap of growth milestones. Each milestone, such as "hire new associates," "expand client services," and "launch marketing campaign," may be represented as a vertex. Edges 156 may be drawn to represent modeled interdependencies 158; for instance, the edge from "hire new associates" to "expand client services" may indicate that hiring may occur before service expansion. Each vertex may be assigned a weighted objective 160 based on predicted return data 124, for example, expanding client services may be assigned a higher weight 122 because it may drive revenue growth more directly than the marketing campaign. The processor 102 may then perform a topological sort 164 conditioned on the weighted objectives 160. This may ensure that while all prerequisite dependencies are respected, vertices 154 with higher weighted objectives 160 may be scheduled earlier when alternatives exist. The output may be an execution order 162 such as: (1) hire new associates, (2) expand client services, (3) launch marketing campaign. In a non-limiting example, technologies such as graph databases for representing vertices 154 and edges 156, machine learning models for computing weighted objectives 160, and scheduling engines for assigning temporal data 148 may be used together to generate a dynamic and optimized sequence output 116.

With continued reference to FIG. 1A-C, the at least a processor 102 may be further configured to store the sequence output 116 in a structured graph database 168, wherein storing the sequence output 116 comprises linking the one or more target datums 106 to prerequisite nodes 170 of the sequence output 116 by generating directed edges 172 between nodes, wherein the directed edges 172 represent a prerequisite-target relationship 174 and enforcing dependency constraints 176 using topological ordering metadata 178. As used in this disclosure, a "structured graph database" is a data storage system that represents and persists information in the form of nodes and edges 156. In an embodiment, the structured graph database 168 may include schemas, indexes, query mechanisms, and the like, that allow the processor 102 to efficiently store, retrieve, and traverse complex relationships among actions 132 of a sequence output 116. As used in this disclosure, a "prerequisite node" is a node within a structured graph database 168 that represents an action or milestone which must be completed, satisfied, or initiated before one or more subsequent actions 132 associated with target data are executed. As used in this disclosure, a "directed edge" is a connection between two nodes in a structured graph database 168 that has a defined direction. Without limitation, the direction may indicate that one node functions as a prerequisite while the other functions as a dependent or target node. As used in this disclosure, a "prerequisite-target relationship" is a dependency link between two nodes, wherein the completion or initiation of the prerequisite node 170 is required for the execution or initiation of the target node. As used in this disclosure, a "dependency constraint" is a rule or condition applied to a set of nodes and edges 156 that enforces ordering, timing, or logical requirements, thereby ensuring that the sequence output 116 is executed in a valid and coherent manner. As used in this disclosure, a "topological ordering metadata" is auxiliary data generated by the processor 102 to record a valid sequence of nodes in a graph such that for every directed edge 172 from a prerequisite node 170 to a target node, the prerequisite node 170 appears before the target node in the sequence. In a non-limiting example, the processor 102 may store a sequence output 116 in a structured graph database 168 by creating nodes that represent discrete corporate law actions 132, such as "draft merger agreement," "conduct due diligence," and "obtain board approval." The processor 102 may define "conduct due diligence" as a prerequisite node 170 and generate a directed edge 172 from that node to the "draft merger agreement" node, thereby establishing a prerequisite-target relationship 174. In a non-limiting example, dependency constraints 176 may enforce that "obtain board approval" cannot occur until both "draft merger agreement" and "prepare financial disclosures" nodes are complete. The processor 102 may then generate topological ordering metadata 178 to ensure that when the graph is traversed or executed, the nodes are always visited in a sequence that respects these prerequisite-target relationships 174. In a non-limiting example, if new entity data introduces an additional step such as "regulatory filing with the SEC," the processor 102 may insert a new node into the graph, link it to prerequisite and target nodes using new directed edges 172, and update the topological ordering metadata 178 accordingly. This structure may allow the law firm to dynamically adjust the sequence of corporate transaction steps as conditions change, while still maintaining compliance and alignment with target milestones such as transaction closing dates. Technologies that may support this process may include graph query languages such as Cypher or Gremlin, graph databases such as Neo4j, Amazon Neptune, or TigerGraph, and constraint-satisfaction solvers that operate alongside the graph database to enforce corporate transaction dependencies and deadlines.

With continued reference to FIG. 1A-C, the at least a processor 102 may be further configured to store the sequence output 116 in an immutable record 180, wherein storing the sequence output 116 comprises hashing batched sequence states 182 to generate block identifiers 184 and linking each block identifier to a prior block identifier 186 to form an append-only, sequential record. As used in this disclosure, an "immutable record" is a storage construct that cannot be altered once written, wherein each entry is preserved in its original state to ensure auditability, traceability, and protection against tampering. As used in this disclosure, a "batched sequence state" is a grouping of one or more sequence output 116 states collected at a given point in time. In an embodiment the batch sequence state 182 may represent a snapshot of the ordered actions 132, dependencies, and temporal assignments 134. As used in this disclosure, a "block identifier" is a unique reference value generated by hashing the contents of a batched sequence state. In an embodiment, the block identifier may ensure data integrity by enabling the processor 102 to verify that the state has not been altered. As used in this disclosure, a "prior block identifier" is the block identifier associated with the immediately preceding batched sequence state. Without limitation, the prior block identifier 186 may be stored alongside the current block identifier to establish continuity between records. As used in this disclosure, an "append-only sequential record" is a chained series of block identifiers 184 representing consecutive batched sequence states 182. In an embodiment, each new record may be appended to the end of the chain without modification to earlier entries, thereby creating a chronological and tamper-resistant ledger. In a non-limiting example, the processor 102 may create an immutable record 180 of a law firm's corporate transaction workflow. A first batched sequence state may capture the initial sequence of actions 132, such as "conduct due diligence," "draft merger agreement," and "prepare disclosure schedules." The processor 102 may hash this batched sequence state to generate a block identifier, which may be stored as the first entry in the append-only sequential record 188. When the sequence output 116 evolves, for example, after adding "obtain shareholder approval," the updated sequence may form a new batched sequence state. The processor 102 may hash this state to generate a new block identifier, and link it to the prior block identifier 186 representing the earlier state. In a non-limiting example, this chaining process may continue as the deal progresses, ensuring that every revision of the sequence output 116 is preserved and verifiable. If an auditor later needs to confirm when and how a step such as "file regulatory approval with the SEC" was introduced, the append-only sequential record 188 provides a tamper-resistant history of the transaction roadmap. Without limitation, the apparatus 100*a-c* may use cryptographic hashing algorithms such as SHA-256, blockchain or distributed ledger systems for decentralized verification, and append-only log structures maintained in secure cloud storage or specialized databases designed for immutability.

With continued reference to FIG. 1A-C, the at least a processor 102 may be further configured to generate alternative sequencing outputs 190 using perturbed parameters 192 and select the alternative sequencing output 194 of the alternative sequencing outputs 190 that maximizes a defined objective 196 of the target data. As used in this disclosure, an "alternative sequencing output" is a variant of a sequence output 116 generated by the processor 102. In an embodiment, the alternative sequencing output 194 may represent different possible arrangements of actions 132, dependencies, or temporal assignments 134 that may arise from adjusted parameters or conditions. As used in this disclosure, a "perturbed parameter" is an intentionally modified input variable, constraint, or weighting factor applied to the sequencing process. In an embodiment, the perturbed parameter may be small or controlled in order to explore how variations in input affect the resulting sequence output 116. As used in this disclosure, a "defined objective" is a measurable goal or evaluation criterion that the processor 102 applies when selecting among alternative sequencing outputs 190. In an embodiment, the defined objective 196 may be tied to the target data and may include efficiency, accuracy, performance, cost reduction, or risk minimization. In a non-limiting example, the processor 102 may generate multiple alternative sequencing outputs 190 for a corporate transaction workflow at a law firm. The initial sequence output 116 may order actions 132 as follows: (1) conduct due diligence, (2) draft merger agreement, (3) prepare disclosure schedules, and (4) obtain board approval. The processor 102 may then introduce perturbed parameters 192, such as modifying resource availability, adjusting deadlines, changing weight 122 assignments tied to predicted return data 124, and the like. One alternative sequencing output 194 may prioritize "draft merger agreement" earlier if drafting resources are available sooner, while another alternative sequencing output 194 may prioritize "prepare disclosure schedules" earlier if regulatory timelines are given greater weight 122. The processor 102 may evaluate each alternative sequencing output 194 against a defined objective 196. For example, if the defined objective 196 is efficiency, the processor 102 may select the sequence that minimizes overall time-to-completion by optimizing parallel work streams. If the defined objective 196 is accuracy, the processor 102 may select the sequence that allocates more time to due diligence before drafting, reducing the likelihood of errors in the agreement. If the defined objective 196 is performance tied to client deliverables, the processor 102 may select the sequence that maximizes the likelihood of closing the transaction by a contractual deadline. In a non-limiting example, the processor 102 may use optimization frameworks such as Monte Carlo simulations to test multiple perturbed parameter sets, reinforcement learning models 126 to learn which sequencing outputs historically achieved better results, and multi-objective optimization algorithms to balance trade-offs between efficiency, cost, and risk. Without limitation, this may allow the apparatus 100*a-c* to dynamically explore and select the sequencing output that best satisfies the chosen defined objective 196 of the target data. As used in this disclosure, a "Monte Carlo simulation" is a computational technique that uses repeated random sampling to model the probability distribution of outcomes in a process that has inherent uncertainty. In an embodiment, the Monte Carlo simulation may provide statistical estimates of performance, risk, or efficiency based on variations in input parameters. In a non-limiting example, the processor 102 may apply Monte Carlo simulations to evaluate alternative sequencing outputs 190 by repeatedly perturbing parameters such as resource availability, deadline flexibility, or task durations. Each simulation run may generate a different possible sequence, and the outcomes may be aggregated to estimate probabilities of meeting defined objectives 196. For instance, one simulation run may reveal that if due diligence takes longer than expected, the probability of meeting a transaction closing deadline drops by 20%. Another simulation run may show that if more resources are allocated early to drafting, the likelihood of achieving efficiency objectives increases by 15%. In a non-limiting example, the processor 102 may use thousands of Monte Carlo iterations to produce a distribution of outcomes that quantify the risks and benefits of each alternative sequencing output 194. This allows the system to select not just a single "best guess" sequence, but the sequence with the highest probability of success given real-world uncertainty. Technologies that may support this process include statistical modeling libraries (e.g., NumPy, SciPy, TensorFlow Probability), cloud-based compute clusters for large-scale simulations, and visualization tools to display outcome distributions to end users through dashboards.

With continued reference to FIG. 1A-C, the at least a processor 102 may be further configured to detect critical-path changes resulting from updates to the plurality of entity data 112 and notify a downstream device of impacted actions 132 and revised temporal data 148 associated with the sequence output 116. As used in this disclosure, a "critical-path change" is a modification to the sequence of actions 132 that directly affects the minimum time required to complete a sequence output 116. Without limitation, the modification may arise from updates to entity data 112 that change the dependencies, adjust the durations, or redefine the prerequisite relationships of actions 132 positioned on the critical path. As used in this disclosure, an "impacted action" is an action within the sequence output 116 that is directly or indirectly affected by a critical-path change. In an embodiment, the impacted action may require rescheduling, reallocation of resources, adjustment of dependencies, and the like, to maintain alignment with target data. As used in this disclosure, "revised temporal data" is updated timing information associated with one or more actions 132 in the sequence output 116. In an embodiment, the revised temporal data may include new start times, end times, deadlines, durations, and the like, that reflect adjustments resulting from critical-path changes. In a non-limiting example, the processor 102 may detect a critical-path change when new entity data indicates that regulatory approval for a corporate merger will take longer than originally expected. Without limitation, this delay may alter the minimum achievable timeline for closing the transaction, thereby creating downstream effects. The impacted actions 132 may include "draft merger agreement" and "obtain shareholder approval," which must be rescheduled to account for the extended regulatory review period. The processor 102 may then generate revised temporal data 148, such as moving the projected start of shareholder approval from May 15 to June 10, and extending the deadline for closing from June 30 to July 20. In a non-limiting example, the processor 102 may use critical path method (CPM) algorithms to detect changes, graph traversal techniques to identify impacted actions 132, and scheduling engines to compute revised temporal data 148. Notifications may then be sent to downstream devices such as case management systems, project dashboards, calendar APIs, and the like, ensuring that attorneys, clients, and stakeholders are automatically updated with the new timeline and dependencies.

With continued reference to FIG. 1A-C, the at least a processor 102 may be further configured to display, using a user interface 198, the sequence output 116 by generating a user dashboard comprising at least a timeline of events associated with each action of the sequence output 116 and highlighting, using the at least a processor 102, a first action of the sequence output 116 corresponding to a first temporal datum of the plurality of temporal data 148. As used in this disclosure, a "user interface" is a collection of hardware and/or software components configured to enable interaction between a user and a computing device, wherein the user interface 198 facilitates the presentation of data to the user and the reception of input from the user. The user interface 198 may include, without limitation, graphical user interfaces, command-line interfaces, application programming interfaces, voice-based interfaces, haptic interfaces, or augmented reality interfaces. A "graphical user interface," as used herein, is a graphical form of user interface 198 that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1A-C, in an embodiment, the graphical user interface and an event handler may operate together to enable seamless interaction between the user and the apparatus 100_a-c_. The GUI serves as the visual and interactive layer through which the user engages with the apparatus 100_a-c_, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100_a-c_ to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1A-C, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1A-C, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1A-C, in an embodiment, the apparatus 100_a-c_ and or the downstream device may include a data structure. As used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 102, wherein elements within graphical user interface may be modified as a result. In some cases, processor 102 may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure. The data structure may retrieve the relevant information such as, text explanations, videos, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1A-C, as used in this disclosure, an "interactive element" is a component or feature within a graphical user interface (GUI) that allows users to perform actions, provide input, or engage with the apparatus 100*a-c*. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements May operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100*a-c* may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1A-C, as used in this disclosure, "downstream device" is a device that accesses and interacts with apparatus 100*a-c*. For instance, and without limitation, downstream device may include a remote device and/or apparatus 100*a-c*. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity 110. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the sequence output 116 may include displaying the sequence output 116 at display device using a visual interface.

With continued reference to FIG. 1A-C, as used in this disclosure, a "user dashboard" is a graphical interface generated by the processor 102 that presents the sequence output 116. Without limitation, the user dashboard may present the sequence output 116 in an organized, interactive format. Without limitation, the dashboard may provide visualizations, summaries, status indicators, and the like, of actions 132 aligned with target data. As used in this disclosure, a "timeline of events" is a visual or tabular representation within the user dashboard that arranges actions 132 of the sequence output 116 along a chronological axis. In an embodiment, each event may correspond to an action and may be displayed with its associated temporal data 148, such as start time, deadline, or duration. In a non-limiting example, the processor 102 may generate a user dashboard that allows attorneys and project managers at a corporate law firm to view the status of an ongoing transaction. The user dashboard may include a timeline of events that displays key actions 132 such as "conduct due diligence," "draft merger agreement," "obtain board approval," and "file regulatory documents," each arranged according to their temporal data 148. The first action, such as "conduct due diligence," may be highlighted on the dashboard to guide the user's attention to the earliest milestone requiring immediate execution. In a non-limiting example, the dashboard may present interactive features such as filters for viewing actions 132 by category (e.g., legal, financial, regulatory), progress bars indicating completion status, and alerts triggered by critical-path changes or missed deadlines. The processor 102 may update the dashboard dynamically as new entity data is received, ensuring that the timeline of events and the highlighted first action remain aligned with the evolving sequence output 116. Technologies that may support this functionality may include front-end frameworks (e.g., React, Angular) for building interactive dashboards, data visualization libraries (e.g., D3.js, Chart.js) for rendering timelines, and real-time messaging protocols (e.g., WebSockets) for ensuring that users always see the latest sequence state.

With continued reference to FIG. 1A-C, the apparatus 100*a-c* may be industry agnostic and may be applied across a wide range of sectors, including without limitation legal, medical, financial, educational, manufacturing, and technology industries. In a non-limiting example, within the legal industry, the apparatus 100*a-c* may be used to sequence actions 132 such as conducting due diligence, drafting agreements, obtaining approvals, and filing regulatory documents, ensuring that dependencies and deadlines are efficiently managed. In a non-limiting example, within the medical industry, the apparatus 100*a-c* may be applied to manage patient care pathways, where diagnostic tests, treatments, follow-up procedures, and compliance checks are sequenced according to medical priorities and regulatory requirements. In a non-limiting example, within the financial industry, the apparatus 100*a-c* may be applied to coordinate actions 132 for loan approvals, investment portfolio rebalancing, or regulatory audits, where multiple interdependent steps must be aligned to achieve time-sensitive financial targets. In a non-limiting example, within the educational sector, the apparatus 100*a-c* may generate sequence outputs for curriculum delivery, accreditation processes, or student performance tracking, ensuring that prerequisites are completed before advancing to subsequent milestones. In a non-limiting example, within the manufacturing industry, the apparatus 100*a-c* may be configured to manage production line sequencing, equipment maintenance schedules, and supply chain logistics, where changes in raw material availability trigger recalibration of downstream processes. In a non-limiting example, within the technology sector, the apparatus 100*a-c* may be used for software development lifecycles, managing dependencies between coding, testing, deployment, and monitoring stages, while continuously recalibrating based on updated performance data.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
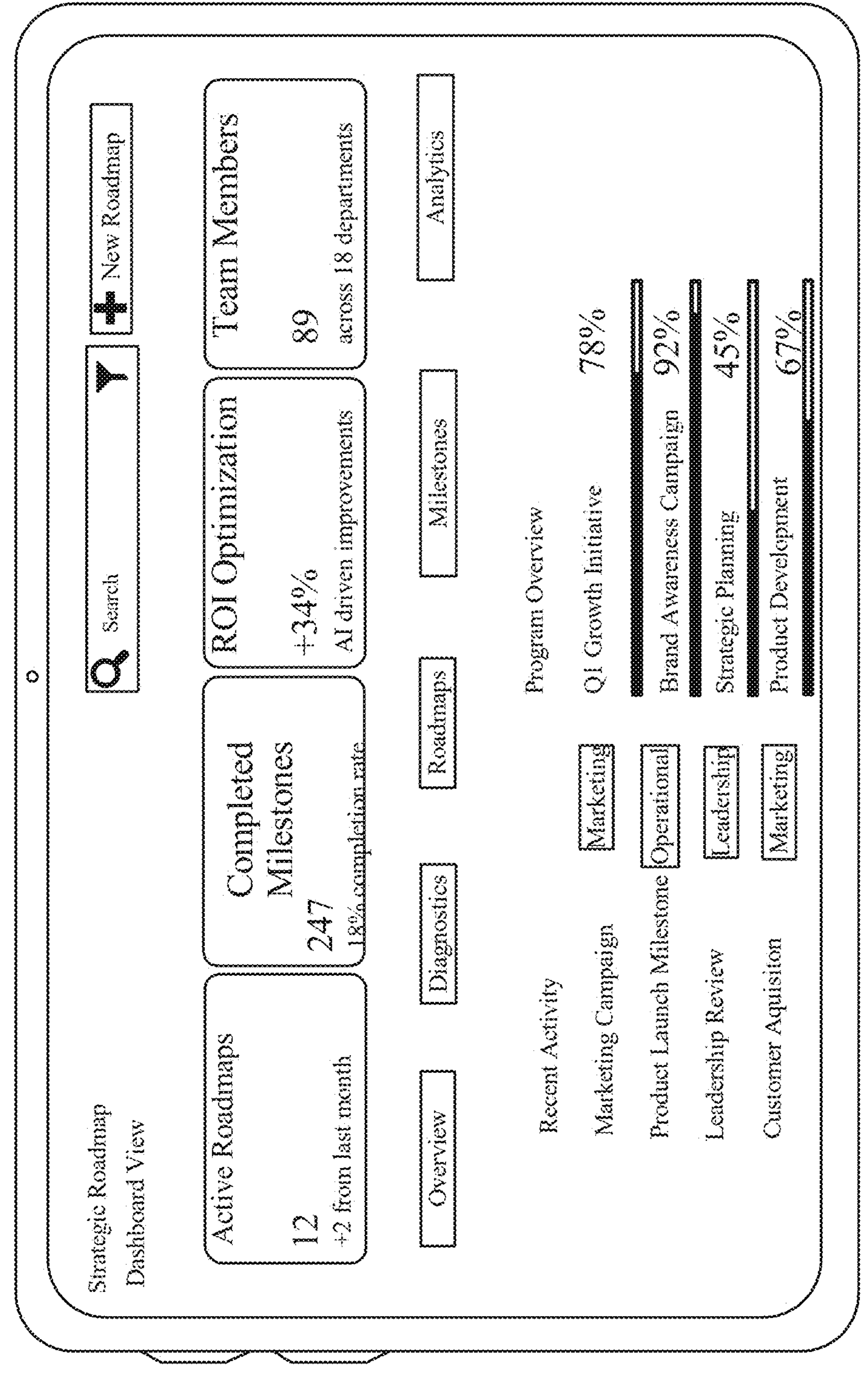
FIG. 2A is an exemplary illustration of a graphical user interface displaying a user dashboard.

Referring now to FIG. 2, an exemplary illustration 200*a* of a graphical user interface displaying a user dashboard. In an embodiment, the user interface may display a user dashboard that organizes key performance indicators, activity updates, program progress, and the like into a consolidated view. In a non-limiting example, the upper portion of the dashboard may provide high-level summaries in the form of tiles, including Active Roadmaps such as, 12 active with a growth of +2 from last month, Completed Milestones such as, 247 with an 18% completion rate, ROI Optimization such as, +34% improvement attributed to AI-driven enhancements, and Team Members such as, 89 contributors distributed across 18 departments. Without limitation, these tiles may provide at-a-glance insights into organizational progress, resource allocation, and efficiency improvements. In a non-limiting example, the central navigation portion may include labeled tabs such as Overview, Diagnostics, Roadmaps, Milestones, and Analytics, which may permit users to drill deeper into specific aspects of the sequence output. In an embodiment, a search bar and a "New Roadmap" button may also be provided, enabling users to query existing roadmaps or initiate new planning sequences. In a non-limiting example, the lower section of the dashboard may display Recent Activity, such as actions categorized under "Marketing Campaign," "Product Launch Milestone," "Leadership Review," and "Customer Acquisition," with each tagged according to categories like Marketing, Operational, or Leadership. Adjacent to this, a Program Overview panel may display progress indicators in the form of percentage-based completion bars, where initiatives such as "Q1 Growth Initiative," "Brand Awareness Campaign," "Strategic Planning," and "Product Development" are visually tracked. Without limitation, these bars may permit rapid recognition of which initiatives are on track, ahead, or lagging. In a non-limiting example, the dashboard may be interactive, allowing a user to highlight specific actions, review temporal data, or view diagnostic drill-downs for milestone verification. This configuration may ensure that the sequence output is not only logically and temporally represented but also accessible and actionable for decision-makers across different departments.

Figure 2B:
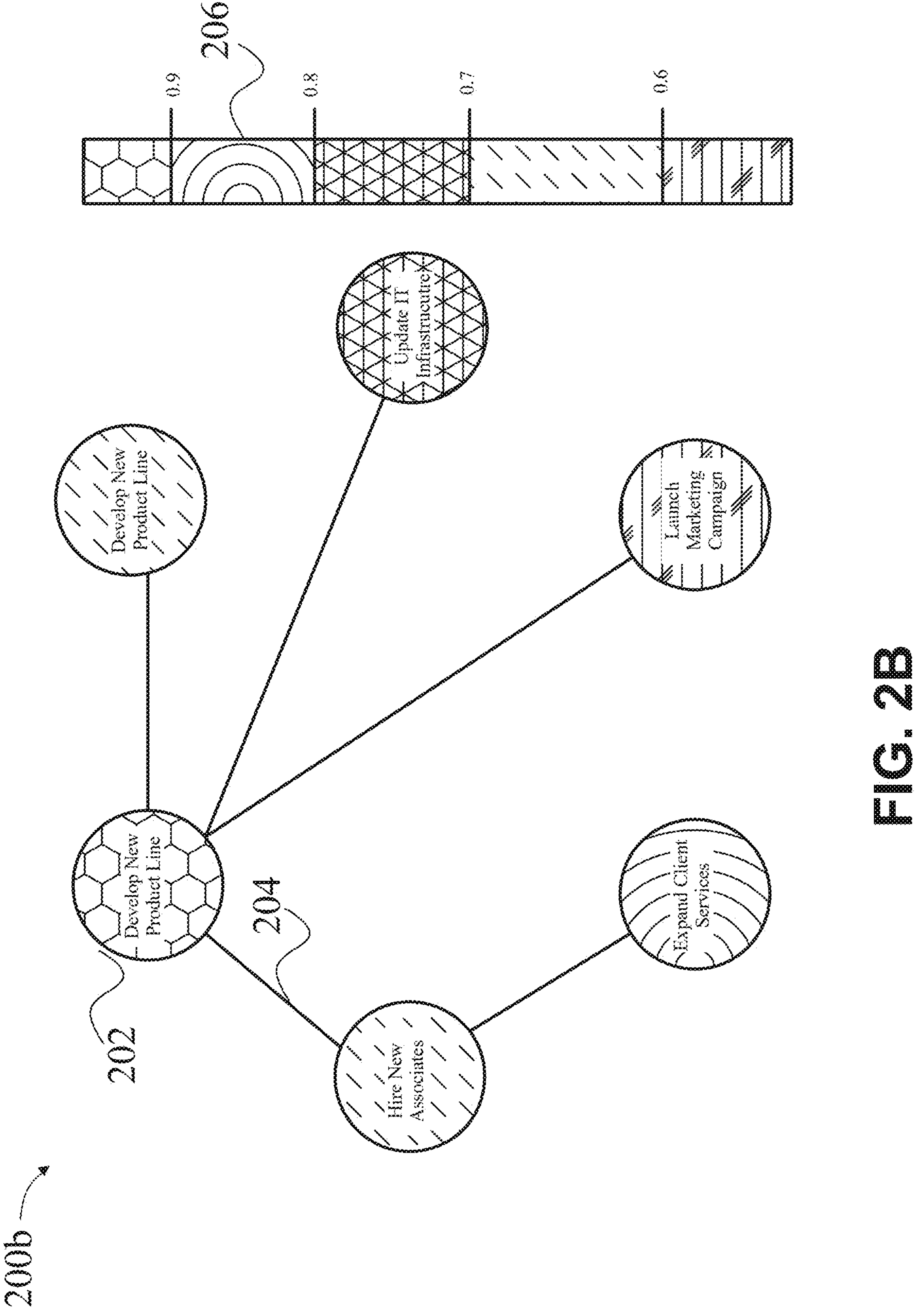
FIG. 2B is an exemplary illustration of a directed graph.

Referring now to FIG. 2B, an exemplary illustration 200*b* of a directed graph is shown. In an embodiment, the directed graph may include a plurality of vertices 202 representing actions, a plurality of directed edges 204 representing modeled interdependencies among the actions, and a plurality of weighted objectives 206 assigned to the vertices 202. Without limitation, the vertices 202 may correspond to milestones such as "hire new associates," "expand client services," "upgrade IT infrastructure," "conduct market research," "develop new product line," and "launch marketing campaign." The directed edges 204 may represent dependencies such as prerequisites, sequencing constraints, or conditional triggers that govern the execution of the actions. In a non-limiting example, an edge 204 may connect the vertex 202 labeled "hire new associates" to the vertex 202 labeled "expand client services," thereby indicating that service expansion may depend on the successful hiring of personnel. Similarly, an edge 204 from the vertex 202 labeled "conduct market research" to the vertex 202 labeled "develop new product line" may indicate that market research may be completed before new product development is initiated. Each vertex 202 may be associated with a weighted objective 206 that reflects the importance, urgency, or predicted return value of the corresponding action relative to other actions. The directed graph may be processed using a dependency-mapping algorithm to generate a sequence output, wherein the sequence output may include an execution order that accounts for the weighted objectives 206 in combination with the modeled interdependencies defined by edges 204. In this manner, higher-priority actions may be advanced earlier in the sequence while prerequisite constraints are satisfied. Without limitation, the directed graph comprising vertices 202, edges 204, and weighted objectives 206 may serve as an adaptive roadmap that dynamically recalibrates as new data, updated weights, or evolving constraints become available.

Figure 3:
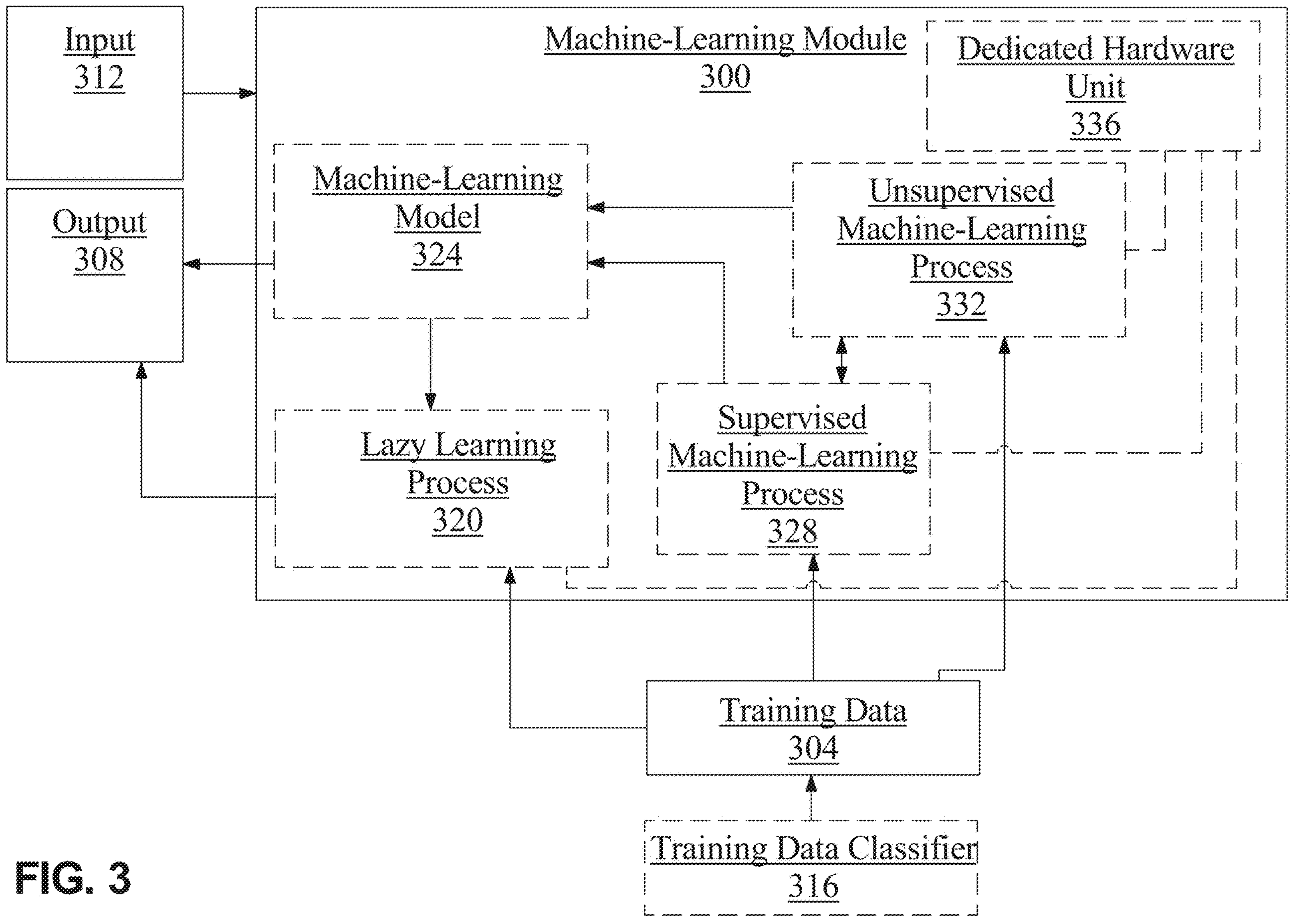
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, the input data may include classified entity data such as financial records, staffing levels, regulatory deadlines, or operational milestones, together with associated temporal data and dependency relationships. The output data may include weighted sequencing decisions, predicted return data values, recalibrated action orders, or modified sequence outputs that reflect updated inter-node dependencies and temporal assignments. In this way, the training data may enable the machine-learning module to learn how variations in input conditions, such as a change in available resources or the introduction of new regulatory requirements, correspond to optimized sequencing outputs that better align with target data.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a subset of characteristics that define a sub-population, such as a cohort of corporate entities undergoing regulatory review, a group of patients sharing similar diagnostic profiles, or a collection of manufacturing processes that exhibit related efficiency constraints.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_1^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include historical entity data, classified categories of data (e.g., revenue figures, staffing levels, compliance deadlines), and temporal attributes as inputs, and may include weighted classifications, predicted return data values, or sequence outputs with defined execution orders as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
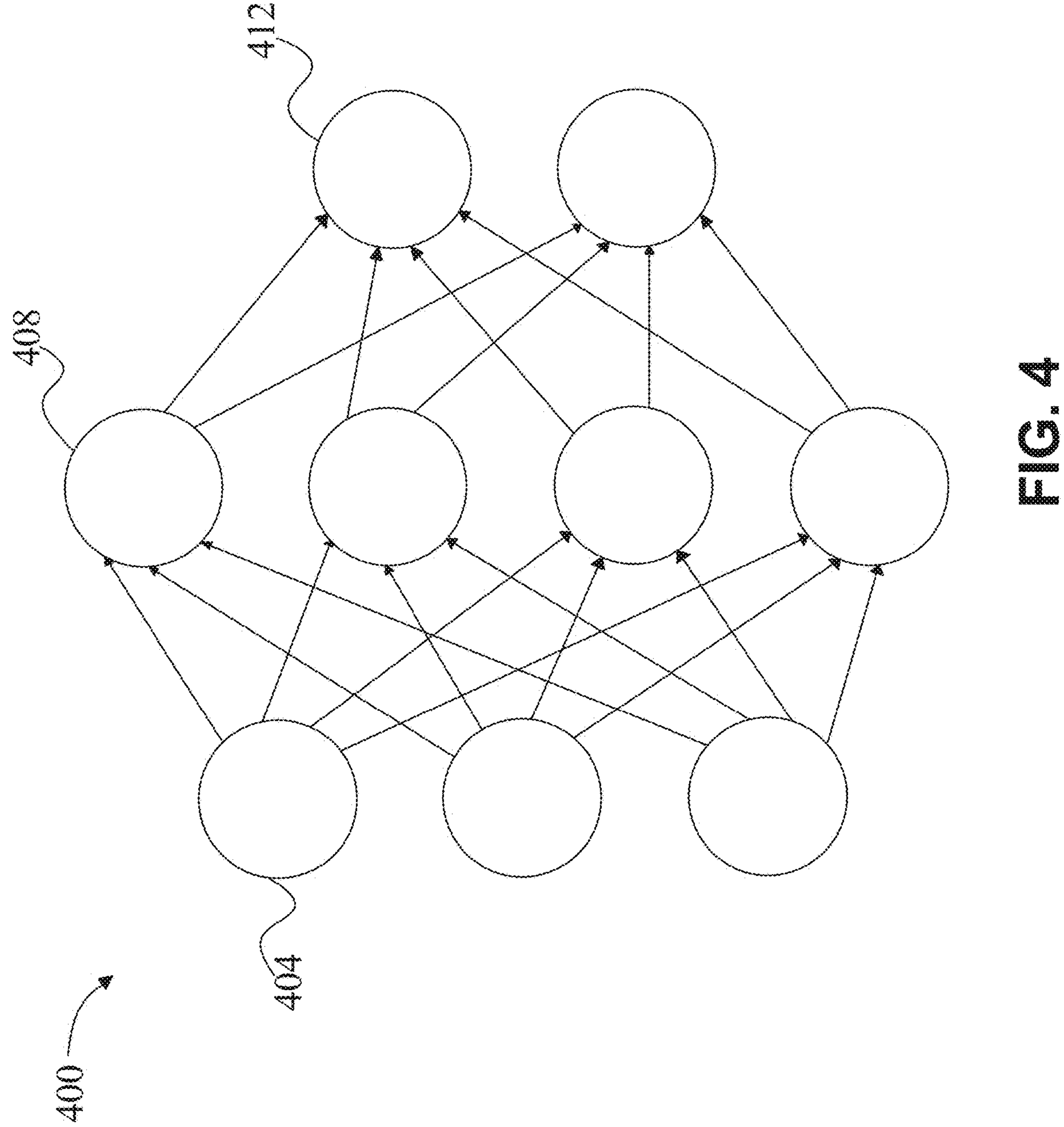
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
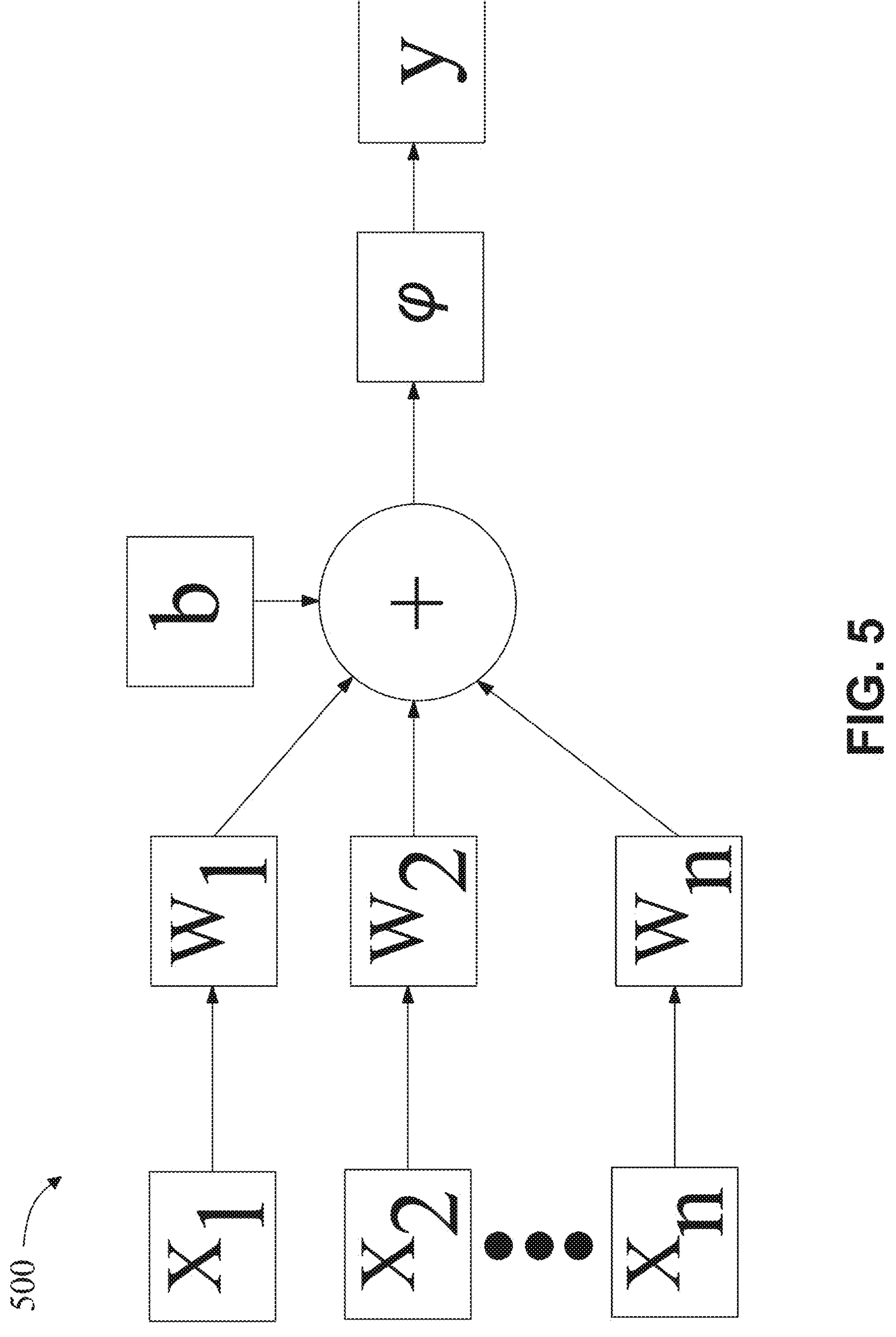
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given a tan h derivative function such input x, a tan h (hyperbolic tangent) function, of the form $$\frac{e^x - e^{-x}}{e^x + e^{-x}},$$

a tan h derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
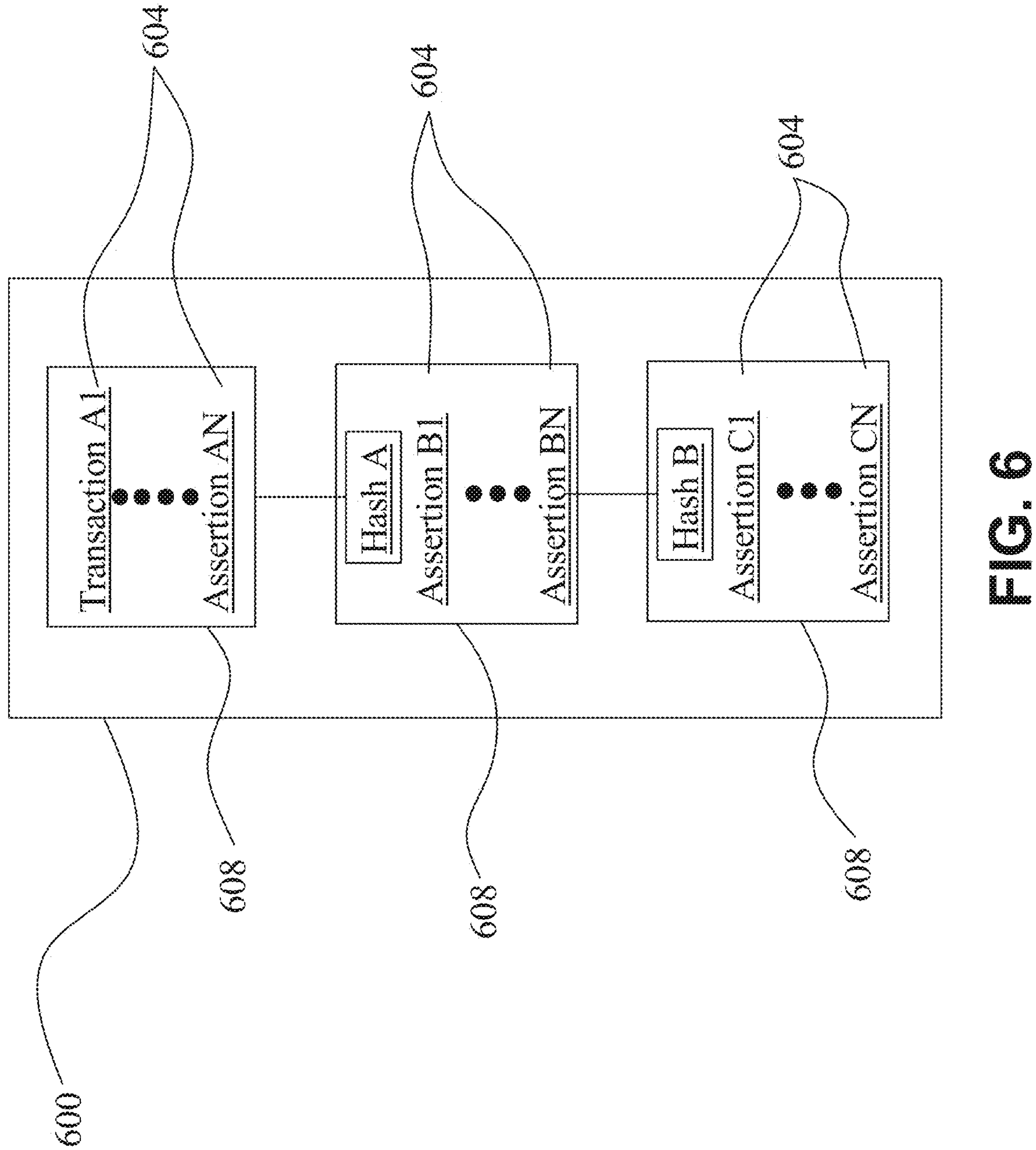
FIG. 6 is an exemplary embodiment of an immutable sequential listing.

Referring now to FIG. 6, an exemplary embodiment of an immutable sequential listing 600 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Data elements are listed in immutable sequential listing 600; data elements may include any form of data, including textual data, image data, encrypted data, cryptographically hashed data, and the like. Data elements may include, without limitation, one or more at least a digitally signed assertions. In one embodiment, a digitally signed assertion 604 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 604. In an embodiment, collection of textual data states that the owner of a certain transferable item represented in a digitally signed assertion 604 register is transferring that item to the owner of an address. A digitally signed assertion 604 may be signed by a digital signature created using the private key associated with the owner's public key, as described above.

Still referring to FIG. 6, a digitally signed assertion 604 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g.; a ride share vehicle or any other asset. A digitally signed assertion 604 may describe the transfer of a physical good; for instance, a digitally signed assertion 604 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 604 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 6, in one embodiment, an address is a textual datum identifying the recipient of virtual currency or another item of value in a digitally signed assertion 604. In some embodiments, address is linked to a public key, the corresponding private key of which is owned by the recipient of a digitally signed assertion 604. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 604 may record a subsequent a digitally signed assertion 604 transferring some or all of the value transferred in the first a digitally signed assertion 604 to a new address in the same manner. A digitally signed assertion 604 may contain textual information that is not a transfer of some item of value in addition to, or as an alternative to, such a transfer. For instance, as described in further detail below, a digitally signed assertion 604 may indicate a confidence level associated with a distributed storage node as described in further detail below.

In an embodiment, and still referring to FIG. 6 immutable sequential listing 1XX records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 600 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 6, immutable sequential listing 600 may preserve the order in which the at least a posted content took place by listing them in chronological order; alternatively or additionally, immutable sequential listing 600 may organize digitally signed assertions 604 into sub-listings 608 such as "blocks" in a blockchain, which may be themselves collected in a temporally sequential order; digitally signed assertions 604 within a sub-listing 608 may or may not be temporally sequential. The ledger may preserve the order in which at least a posted content took place by listing them in sub-listings 608 and placing the sub-listings 608 in chronological order. The immutable sequential listing 600 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 600 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 6, immutable sequential listing 600, once formed, may be inalterable by any party, no matter what access rights that party possesses. For instance, immutable sequential listing 600 may include a hash chain, in which data is added during a successive hashing process to ensure non-repudiation. Immutable sequential listing 600 may include a block chain. In one embodiment, a block chain is immutable sequential listing 600 that records one or more new at least a posted content in a data item known as a sub-listing 608 or "block." An example of a block chain is the BITCOIN block chain used to record BITCOIN transactions and values. Sub-listings 608 may be created in a way that places the sub-listings 608 in chronological order and link each sub-listing 608 to a previous sub-listing 608 in the chronological order so that any computing device may traverse the sub-listings 608 in reverse chronological order to verify any at least a posted content listed in the block chain. Each new sub-listing 608 may be required to contain a cryptographic hash describing the previous sub-listing 608. In some embodiments, the block chain contains a single first sub-listing 608 sometimes known as a "genesis block."

Still referring to FIG. 6, the creation of a new sub-listing 608 may be computationally expensive; for instance, the creation of a new sub-listing 608 may be designed by a "proof of work" protocol accepted by all participants in forming the immutable sequential listing 600 to take a powerful set of computing devices a certain period of time to produce. Where one sub-listing 608 takes less time for a given set of computing devices to produce the sub-listing 608 protocol may adjust the algorithm to produce the next sub-listing 608 so that it will require more steps; where one sub-listing 608 takes more time for a given set of computing devices to produce the sub-listing 608 protocol may adjust the algorithm to produce the next sub-listing 608 so that it will require fewer steps. As an example, protocol may require a new sub-listing 608 to contain a cryptographic hash describing its contents; the cryptographic hash may be required to satisfy a mathematical condition, achieved by having the sub-listing 608 contain a number, called a nonce, whose value is determined after the fact by the discovery of the hash that satisfies the mathematical condition. Continuing the example, the protocol may be able to adjust the mathematical condition so that the discovery of the hash describing a sub-listing 608 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 608 according to the protocol is known as "mining." The creation of a new sub-listing 608 may be designed by a "proof of stake" protocol as will be apparent to those skilled in the art upon reviewing the entirety of this disclosure.

Continuing to refer to FIG. 6, in some embodiments, protocol also creates an incentive to mine new sub-listings 608. The incentive may be financial; for instance, successfully mining a new sub-listing 608 may result in the person or entity that mines the sub-listing 608 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 608 Each sub-listing 608 created in immutable sequential listing 600 may contain a record or at least a posted content describing one or more addresses that receive an incentive, such as virtual currency, as the result of successfully mining the sub-listing 608.

With continued reference to FIG. 6, where two entities simultaneously create new sub-listings 608, immutable sequential listing 600 may develop a fork; protocol may determine which of the two alternate branches in the fork is the valid new portion of the immutable sequential listing 600 by evaluating, after a certain amount of time has passed, which branch is longer. "Length" may be measured according to the number of sub-listings 608 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 608 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 600 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 600.

Still referring to FIG. 6, additional data linked to at least a posted content may be incorporated in sub-listings 608 in the immutable sequential listing 600; for instance, data may be incorporated in one or more fields recognized by block chain protocols that permit a person or computer forming a at least a posted content to insert additional data in the immutable sequential listing 600. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 6, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 608 in a block chain computationally challenging; the incentive for producing sub-listings 608 may include the grant of new crypto-currency to the miners. Quantities of crypto-currency may be exchanged using at least a posted content as described above.

Figure 7:
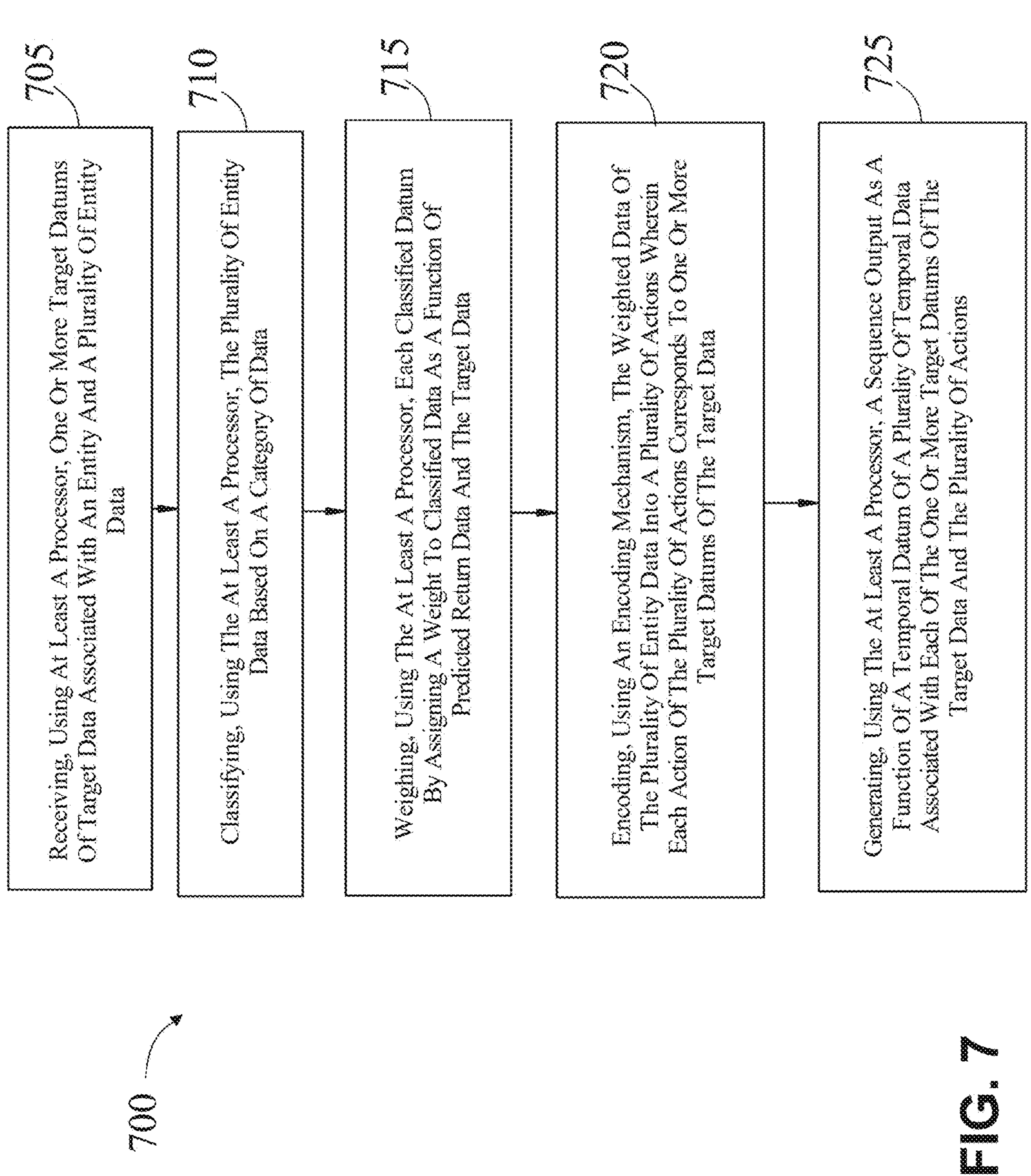
FIG. 7 is a block diagram of an exemplary method for generating a sequence output.

Referring now to FIG. 7, a flow diagram of an exemplary method 700 for generating a sequence output is illustrated. At step 705, method 700 includes receiving, using at least a processor, one or more target datums of target data associated with an entity and a plurality of entity data. In an embodiment, the at least a processor may be further configured to receive new data of the plurality of entity data and target data and continuously update the sequence output as a function of the new data of the plurality of entity data and target data. This may be implemented as described and with reference to FIGS. 1-6.

Still referring to FIG. 7, at step 710, method 700 includes classifying, using the at least a processor, the plurality of entity data based on a category of data. This may be implemented as described and with reference to FIGS. 1-6.

Still referring to FIG. 7, at step 715, method 700 includes weighing, using the at least a processor, each classified datum by assigning a weight to classified data as a function of predicted return data and the target data. In an embodiment, the at least a processor may be further configured to recalibrate, using a reinforcement learning model, the sequence output by recomputing the weight assigned to the categorized data as a function of updated predicted return data, updating inter-node dependencies based on new entity data, and modifying a temporal assignment of the plurality of actions based on entity constraints. This may be implemented as described and with reference to FIGS. 1-6.

Still referring to FIG. 7, at step 720, method 700 includes encoding, using the at least a processor, the weighted data of the plurality of entity data into a plurality of actions wherein each action of the plurality of actions corresponds to one or more target datums of the target data. In an embodiment, the at least a processor may be further configured to verify, using a verification protocol, a completion datum associated with each action of the plurality of actions and generate a modified sequence output based on the completion datum. This may be implemented as described and with reference to FIGS. 1-6.

Still referring to FIG. 7, at step 725, method 700 includes generating, using the at least a processor, a sequence output as a function of a temporal datum of a plurality of temporal data associated with each of the one or more target datums of the target data and the plurality of actions. In an embodiment, the at least a processor may be further configured to generate, using a dependency-mapping algorithm, the sequence output by generating a directed graph comprising vertices and edges, wherein the vertices represent actions and the edges represent modeled interdependencies, prioritizing the vertices using a weighted objective, and producing an execution order by performing a topological sort conditioned on prioritized vertices. In an embodiment, the at least a processor may be further configured to store the sequence output in a structured graph database, wherein storing the sequence output comprises linking the one or more target datums to prerequisite nodes of the sequence output by generating directed edges between nodes, wherein the directed edges represent a prerequisite-target relationship and enforcing dependency constraints using topological ordering metadata. In an embodiment, the at least a processor may be further configured to store the sequence output in an immutable record, wherein storing the sequence output comprises hashing batched sequence states to generate block identifiers and linking each block identifier to a prior block identifier to form an append-only, sequential record. In an embodiment, the at least a processor may be further configured to generate alternative sequencing outputs using perturbed parameters and select the alternative sequencing output of the alternative sequencing outputs that maximizes a defined objective of the target data. In an embodiment, the at least a processor may be further configured to detect critical-path changes resulting from updates to the plurality of entity data and notify a downstream device of impacted actions and revised temporal data associated with the sequence output. In an embodiment, the at least a processor may be further configured to display, using a user interface, the sequence output by generating a user dashboard comprising at least a timeline of events associated with each action of the sequence output and highlighting, using the at least a processor, a first action of the sequence output corresponding to a first temporal datum of the plurality of temporal data. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
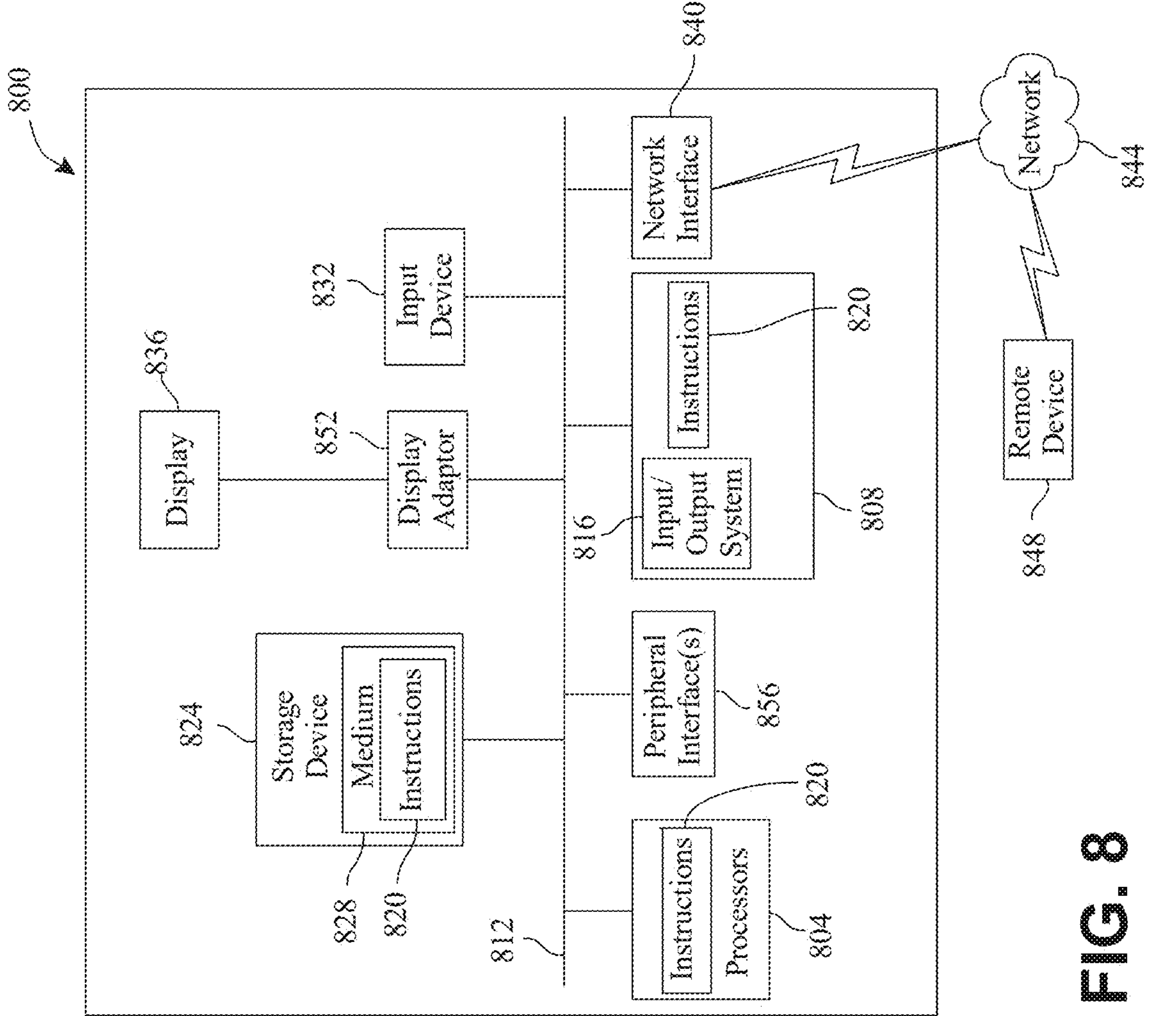
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a sequence output, wherein the apparatus comprises:

at least a computing device, wherein the computing device comprises:

a memory; and at least a processor communicatively connected to the memory, wherein the memory contains instructions configuring the at least a processor to:

receive one or more target datums of target data associated with an entity and a plurality of entity data;

classify the plurality of entity data based on a category of data;

weigh each classified datum by assigning a weight to classified data as a function of predicted return data and the target data;

encode, using an encoding mechanism, weighted data of the plurality of entity data into a plurality of actions wherein each action of the plurality of actions corresponds to one or more target datums of the target data;

execute a machine learning model using the weighted data to generate a derived feature representation comprising a plurality of machine-generated values that are not explicitly present in the plurality of entity data, wherein the derived feature representation is generated as an output of the machine learning model; and generate a sequence output, using the derived feature representation, as a function of a temporal datum of a plurality of temporal data associated with each of the one or more target datums of the target data and the plurality of actions.

2. The apparatus of claim 1, wherein the at least a processor is further configured to:

store the sequence output in a structured graph database, wherein storing the sequence output comprises linking the one or more target datums to prerequisite nodes of the sequence output by:

generating directed edges between nodes, wherein the directed edges represent a prerequisite-target relationship; and enforcing dependency constraints using topological ordering metadata.

3. The apparatus of claim 1, wherein the at least a processor is further configured to recalibrate, using a reinforcement learning model, the sequence output by:

recomputing the weight assigned to categorized data as a function of updated predicted return data;

updating inter-node dependencies based on new entity data; and modifying a temporal assignment of the plurality of actions based on entity constraints.

4. The apparatus of claim 1, wherein the at least a processor is further configured to generate, using a dependency-mapping algorithm, the sequence output by:

generating a directed graph comprising vertices and edges, wherein the vertices represent the plurality of actions and the edges represent modeled interdependencies;

prioritizing the vertices using a weighted objective; and producing an execution order by performing a topological sort conditioned on prioritized vertices.

5. The apparatus of claim 1, wherein the at least a processor is further configured to store the sequence output in an immutable record, wherein storing the sequence output comprises:

hashing batched sequence states to generate block identifiers; and linking each block identifier to a prior block identifier to form an append-only, sequential record.

6. The apparatus of claim 1, wherein the at least a processor is further configured to:

receive new data of the plurality of entity data and target data; and continuously update the sequence output as a function of the new data of the plurality of entity data and target data.

7. The apparatus of claim 6, wherein the at least a processor is further configured to:

verify, using a verification protocol, a completion datum associated with each action of the plurality of actions; and generate a modified sequence output based on the completion datum.

8. The apparatus of claim 1, wherein the at least a processor is further configured to:

generate alternative sequencing outputs using perturbed parameters; and select an alternative sequencing output of the alternative sequencing outputs that maximizes a defined objective of the target data.

9. The apparatus of claim 1, wherein the at least a processor is further configured to:

detect critical-path changes resulting from updates to the plurality of entity data; and notify a downstream device of impacted actions and revised temporal data associated with the sequence output.

10. The apparatus of claim 1, wherein the at least a processor is further configured to display, using a user interface, the sequence output by:

generating a user dashboard comprising at least a timeline of events associated with each action of the sequence output; and highlighting, using the at least a processor, a first action of the sequence output corresponding to a first temporal datum of the plurality of temporal data.

11. A method for generating a sequence output, wherein the method comprises:

receiving, using at least a processor, one or more target datums of target data associated with an entity and a plurality of entity data;

classifying, using the at least a processor, the plurality of entity data based on a category of data;

weighing, using the at least a processor, each classified datum by assigning a weight to classified data as a function of predicted return data and the target data;

encoding, using an encoding mechanism, weighted data of the plurality of entity data into a plurality of actions wherein each action of the plurality of actions corresponds to one or more target datums of the target data;

executing, by the at least processor, a machine learning model using the weighted data to generate a derived feature representation comprising a plurality of machine-generated values that are not explicitly present in the plurality of entity data, wherein the derived feature representation is generated as an output of the machine learning model; and generating, using the at least a processor, a sequence output, using the derived feature representation, as a function of a temporal datum of a plurality of temporal data associated with each of the one or more target datums of the target data and the plurality of actions.

12. The method of claim 11, further comprising:

storing, using the at least a processor, the sequence output in a structured graph database, wherein storing the sequence output comprises linking the one or more target datums to prerequisite nodes of the sequence output by:

generating, using the at least a processor, directed edges between nodes, wherein the directed edges represent a prerequisite-target relationship; and enforcing, using the at least a processor, dependency constraints using topological ordering metadata.

13. The method of claim 11, further comprising recalibrating, using a reinforcement learning model, the sequence output by:

recomputing the weight assigned to categorized data as a function of updated predicted return data;

updating inter-node dependencies based on new entity data; and modifying a temporal assignment of the plurality of actions based on entity constraints.

14. The method of claim 11, further comprising generating, using a dependency-mapping algorithm, the sequence output by:

generating a directed graph comprising vertices and edges, wherein the vertices represent the plurality of actions and the edges represent modeled interdependencies;

prioritizing the vertices using a weighted objective; and producing an execution order by performing a topological sort conditioned on prioritized vertices.

15. The method of claim 11, further comprising storing, using the at least a processor, the sequence output in an immutable record, wherein storing the sequence output comprises:

hashing, using the at least a processor, batched sequence states to generate block identifiers; and linking, using the at least a processor, each block identifier to a prior block identifier to form an append-only, sequential record.

16. The method of claim 11, further comprising:

receiving, using the at least a processor, new data of the plurality of entity data and target data; and continuously updating, using the at least a processor, the sequence output as a function of the new data of the plurality of entity data and target data.

17. The method of claim 16, further comprising:

verifying, using a verification protocol, a completion datum associated with each action of the plurality of actions; and generating, using the at least a processor, a modified sequence output based on the completion datum.

18. The method of claim 11, further comprising:

generating, using the at least a processor, alternative sequencing outputs using perturbed parameters; and selecting, using the at least a processor, an alternative sequencing output of the alternative sequencing outputs that maximizes a defined objective of the target data.

19. The method of claim 11, further comprising:

detecting, using the at least a processor, critical-path changes resulting from updates to the plurality of entity data; and notifying, using the at least a processor, a downstream device of impacted actions and revised temporal data associated with the sequence output.

20. The method of claim 11, further comprising displaying, using a user interface, the sequence output by:

generating, using the at least a processor, a user dashboard comprising at least a timeline of events associated with each action of the sequence output; and highlighting, using the at least a processor, a first action of the sequence output corresponding to a first temporal datum of the plurality of temporal data.

* * * * *